(12) United States Patent
Asadi-Zanjani et al.

(10) Patent No.: US 12,399,118 B2
(45) Date of Patent: Aug. 26, 2025

(54) TERAHERTZ DATA COLLECTION FOR ELECTRONIC OBJECT CLASSIFICATION AND EVALUATION

(71) Applicant: University of Florida Research Foundation, Incorporated, Gainesville, FL (US)

(72) Inventors: Navid Asadi-Zanjani, Gainesville, FL (US); John True, Gainesville, FL (US); Nathan Jessurun, Gainesville, FL (US); Chengjie Xi, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 460 days.

(21) Appl. No.: 17/664,596

(22) Filed: May 23, 2022

(65) Prior Publication Data

US 2023/0077838 A1    Mar. 16, 2023

Related U.S. Application Data

(60) Provisional application No. 63/194,130, filed on May 27, 2021.

(51) Int. Cl.
*G01N 21/3586* (2014.01)
*G01N 21/35* (2014.01)

(52) U.S. Cl.
CPC . *G01N 21/3586* (2013.01); *G01N 2021/3595* (2013.01)

(58) Field of Classification Search
CPC .......... G01N 21/3586; G01N 2021/3595
See application file for complete search history.

(56) References Cited

FOREIGN PATENT DOCUMENTS

CH          716952 B1 *   4/2023    ......... G01N 21/3586
WO   WO-2020104011 A1 *  5/2020    ......... G01N 21/3586

OTHER PUBLICATIONS

Ahi, Kiarash et al. "Advanced Terahertz Techniques for Quality Control and Counterfeit Detection," In: *Terahertz Physics, Devices, and Systems X: Advanced Applications in Industry and Defense*, vol. 9856, May 26, 2016 (2016), 98560G. ISSN: 1996756X. DOI: 10.1117/12.2228684.

(Continued)

*Primary Examiner* — Dani Fox
*Assistant Examiner* — Fani Polyzos Boosalis
(74) *Attorney, Agent, or Firm* — Alston & Bird LLP

(57) ABSTRACT

Various embodiments of the present disclosure provide systems and methods for classifying and evaluating an electronic object based at least in part on terahertz (THz) data. THz data may comprise time-domain THz data collected via THz time domain spectroscopy of the electronic object. THz data may further comprise frequency-domain THz data, which may be generated based at least in part on the time-domain THz data. A unique THz fingerprint may be generated for the electronic object based at least in part on the THz data. This unique THz fingerprint may be compared to an earlier generated THz fingerprint of the same electronic object to evaluate reliability and consistency. The unique THz fingerprint may also be compared to THz fingerprints or THz data of other electronic objects of the same object type, class, design, and/or the like, to validate the electronic object (e.g., determine if the electronic object is counterfeit).

20 Claims, 14 Drawing Sheets

(56) References Cited

OTHER PUBLICATIONS

Ahi, Kiarash. "Mathematical Modeling of THz Point Spread Function and Simulation of THz Imaging Systems," In: *IEEE Transactions on Terahertz Science and Technology*, vol. 7, No. 6, Nov. 2017, pp. 747-754. DOI: 10.1109/TTHZ.2017.2750690.

Ahi, Kiarash et al. "Terahertz Characterization of Electronic Components and Comparison of Terahertz Imaging With X-Ray Imaging Techniques," In: *Terahertz Physics, Devices, and Systems IX: Advanced Applications in Industry and Defense*, Ed. by Mehdi F. Anwar, Thomas W. Crowe, and Tariq Manzur, vol. 9483, International Society for Optics and Photonics, SPIE, May 2015, pp. 82-96. DOI: 10.1117/12.2183128. URL: https://doi.org/10.1117/12.2183128.

Ahi, Kiarash et al. "Modeling of Terahertz Images Based on X-Ray Images: A Novel Approach for Verification of Terahertz Images and Identification of Objects With Fine Details Beyond Terahertz Resolution," In: *Terahertz Physics, Devices, and Systems X: Advanced Applications in Industry and Defense*, vol. 9856, May 2016 (2016), p. 985610. ISSN: 1996756X. DOI: 10.1117/12.2228685.

Ahi, Kiarash et al. "Quality Control and Authentication of Packaged Integrated Circuits Using Enhanced-Spatial-Resolution Terahertz Time-Domain Spectroscopy and Imaging," In: *Optics and Lasers in Engineering*, vol. 104, Jul. 26, 2017 (2018), pp. 274-284. ISSN: 01438166. DOI: 10.1016/j.optlaseng.2017.07.007. URL: https://doi.org/10.1016/j.optlaseng.2017.07.007.

Ahi, Kiarash. "A Method and System for Enhancing the Resolution of Terahertz Imaging," In: *Measurement*, vol. 138, May 2019, pp. 614-619. ISSN: 0263-2241. DOI: https://doi.org/10.1016/j.measurement.2018.06.044. URL: http://www.sciencedirect.com/science/article/pii/S0263224118305700.

* cited by examiner

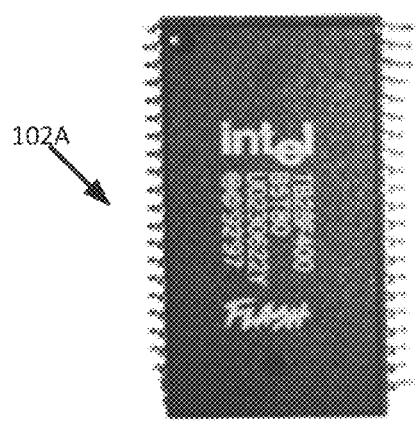
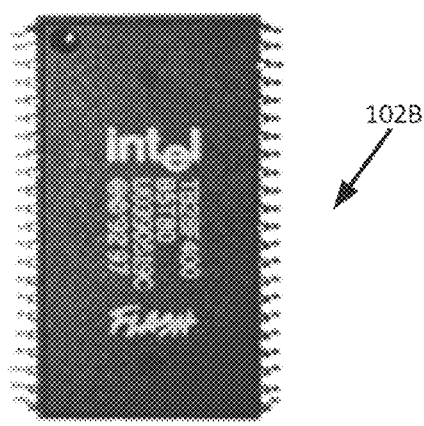
FIG. 4A　　　　　　　　　　　　FIG. 4B
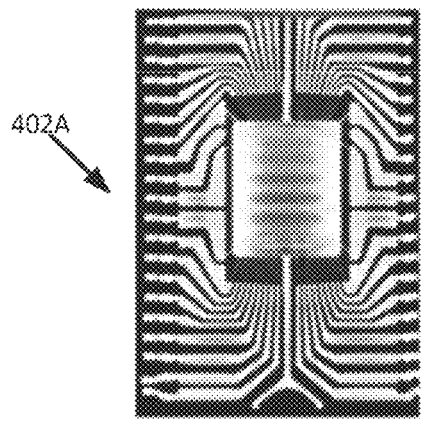
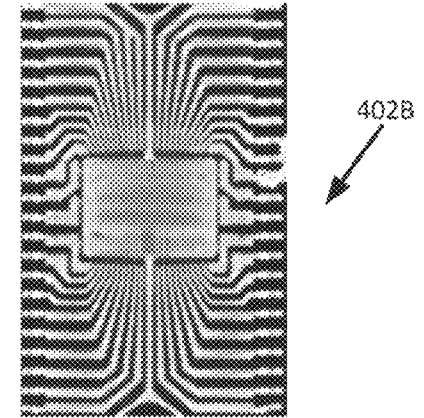
FIG. 4C　　　　　　　　　　　　FIG. 4D
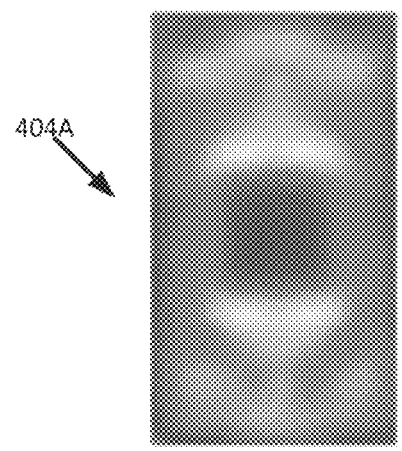
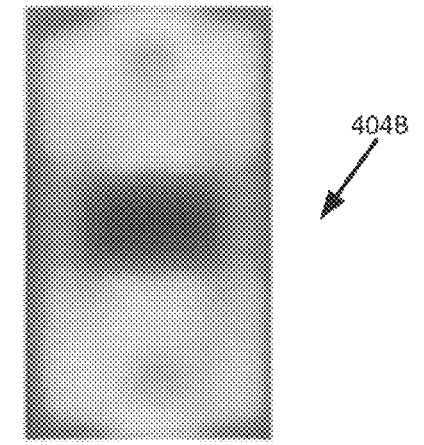
FIG. 4E　　　　　　　　　　　　FIG. 4F

| Preprocessing | Original | | 1st Derivatibe SG Smooth | | 2nd Derivatibe SG Smooth | |
|---|---|---|---|---|---|---|
| Feature selection(PCA) | no PCA | PCA (10 PCs) | no PCA | PCA (10 PCs) | no PCA | PCA (10 PCs) |
| Classification Model | Accuracy (+/-Standard Deviation) | | | | | |
| LDA | 0.6760 (0.0339) | 0.6760 (0.0339) | 0.6350 (0.0273) | 0.8321 (0.0077) | 0.6073 (0.0073) | 0.8088 (0.0078) |
| SCV(linear) | 0.8233 (0.0255) | 0.8189 (0.0410) | 0.8365 (0.0214) | 0.8379 (0.0234) | 0.8394 (0.0226) | 0.8234 (0.0151) |
| SCV(polynomial) | 0.7927 (0.0250) | 0.6642 (0.0090) | 0.6993 (0.0083) | 0.8131 (0.0214) | 0.6929 (0.0099) | 0.7139 (0.0047) |
| RF | 0.8789 (0.0369) | 0.9139 (0.0118) | 0.8891 (0.0303) | 0.8964 (0.0203) | 0.8701 (0.0296) | 0.8555 (0.0307) |
| MLP | 0.7868 (0.0621) | 0.8846 (0.0222) | 0.8656 (0.0308) | 0.8876 (0.0237) | 0.8175 (0.0227) | 0.8234 (0.0241) |
| Preprocessing | SNV | | SNV + 1st Derivatibe SG Smooth | | SNV + 2nd Derivatibe SG Smooth | |
| Feature selection(PCA) | no PCA | PCA (10 PCs) | no PCA | PCA (10 PCs) | no PCA | PCA (10 PCs) |
| Classification Model | Accuracy (+/-Standard Deviation) | | | | | |
| LDA | 0.7926 (0.0247) | 0.7620 (0.0512) | 0.7460 (0.0118) | 0.7649 (0.0398) | 0.7372 (0.0298) | 0.7854 (0.0183) |
| SCV(linear) | 0.8365 (0.0217) | 0.8102 (0.0267) | 0.8452 (0.0258) | 0.7985 (0.0092) | 0.8204 (0.0113) | 0.7927 (0.0250) |
| SCV(polynomial) | 0.8423 (0.0095) | 0.8000 (0.0114) | 0.7840 (0.0246) | 0.8205 (0.0115) | 0.7036 (0.0879) | 0.7124 (0.0137) |
| RF | 0.8905 (0.0126) | 0.9183 (0.0159) | 0.8687 (0.0224) | 0.8978 (0.0171) | 0.8229 (0.0261) | 0.8161 (0.0062) |
| MLP | 0.8890 (0.0118) | 0.9270 (0.0153) | 0.8802 (0.0271) | 0.8788 (0.0183) | 0.8306 (0.0182) | 0.8073 (0.0148) |

FIG. 12A

| Preprocessing | Original | | 1st Derivatibe SG Smooth | | 2nd Derivatibe SG Smooth | |
|---|---|---|---|---|---|---|
| Feature selection(PCA) | no PCA | PCA (10 PCs) | no PCA | PCA (10 PCs) | no PCA | PCA (10 PCs) |
| classification model | Accuracy (+/-Standard Deviation) | | | | | |
| LDA | 0.9792 (0.0361) | 0.9896 (0.0180) | 0.9370 (0.0464) | 0.9475 (0.0453) | 0.9162 (0.0656) | 0.9266 (0.0614) |
| SCV(linear) | 0.9896 (0.0180) | 0.9896 (0.0180) | 0.9896 (0.0180) | 1.0000 | 0.9475 (0.0344) | 0.9475 (0.0344) |
| SCV(polynomial) | 0.9792 (0.0361) | 0.8519 (0.0497) | 0.8324 (0.0577) | 0.8949 (0.0462) | 0.8433 (0.0675) | 0.8225 (0.0895) |
| RF | 0.9574 (0.0308) | 0.9792 (0.0361) | 0.9792 (0.0208) | 0.9896 (0.0180) | 0.9370 (0.0464) | 0.9570 (0.0533) |
| MLP | 0.8542 (0.2292) | 0.9896 (0.0180) | 0.9891 (0.0188) | 1.0000 | 0.9792 (0.0208) | 0.9583 (0.0510) |
| Preprocessing | SNV | | SNV + 1st Derivatibe SG Smooth | | SNV + 2nd Derivatibe SG Smooth | |
| Feature selection(PCA) | no PCA | PCA (10 PCs) | no PCA | PCA (10 PCs) | no PCA | PCA (10 PCs) |
| classification model | Accuracy (+/-Standard Deviation) | | | | | |
| LDA | 0.9370 (0.0464) | 0.9370 (0.0464) | 0.9162 (0.0656) | 0.8741 (0.0408) | 0.9158 (0.0511) | 0.8845 (0.0536) |
| SCV(linear) | 1.0000 | 0.9891 (0.0188) | 0.9891 (0.0188) | 0.9891 (0.0188) | 0.9475 (0.0344) | 0.9579 (0.0295) |
| SCV(polynomial) | 0.9896 (0.0180) | 0.7677 (0.0510) | 0.8637 (0.0533) | 0.8211 (0.0451) | 0.7486 (0.0865) | 0.7382 (0.0982) |
| RF | 0.9792 (0.0361) | 0.9896 (0.0180) | 0.9891 (0.0188) | 1.0000 | 0.9579 (0.0008) | 0.9149 (0.0540) |
| MLP | 1.0000 | 1.0000 | 0.9891 (0.0188) | 0.9896 (0.0180) | 0.9683 (0.0183) | 0.9579 (0.0510) |

FIG. 12B

TERAHERTZ DATA COLLECTION FOR ELECTRONIC OBJECT CLASSIFICATION AND EVALUATION

CROSS-REFERENCE TO RELATED APPLICATION

The present application claims benefit under 35 USC 119 (e) of U.S. Application Ser. 63/194,130, filed May 27, 2021, which is incorporated herein by reference in its entirety.

TECHNOLOGICAL FIELD

Embodiments of the present disclosure generally relate to systems and methods for electronic device identification and counterfeit detection.

BACKGROUND

Electronic devices and components, particularly integrated circuits (ICs), are used in wide varieties of appliances, equipment, and machines. An unexpected failure of an integrated circuit (IC) can lead to the total shut down of a system. These unpredicted failures can happen in critical systems, such as power, aerospace and healthcare systems, and thus are great threats to economies and human lives. In addition to reliability aspects, ICs need to be immune against cyber-attacks and surveillance. Malicious counterfeit ICs have been used as Trojan horses for taking control of critical systems and information. Reliability and authenticity of ICs are two critical factors which are to be determined before assembling an IC into a system.

BRIEF SUMMARY

In general, embodiments of the present disclosure provide methods, apparatus, system, computing devices, computing entities, and/or the like for reliable terahertz (THz) signal fingerprinting for robust electronic object identification and counterfeit detection. In various embodiments, an electronic object may be classified and/or evaluated based on collected THz data. The collected THz data may include time-domain THz data and frequency-domain THz data, and a unique THz fingerprint for the electronic object may be generated based at least in part on the time-domain THz data and the frequency-domain THz data. In various embodiments, the THz data is collected via THz time domain spectroscopy (THz-TDS). Based at least in part on evaluating the THz fingerprint, the electronic object may be classified in a reliability evaluation and/or in a counterfeit detection. In various embodiments, classification of the electronic object with respect to a reliability evaluation may comprise comparing the THz fingerprint to another THz fingerprint for the electronic object previously generated at an earlier point in time (e.g., an earlier stage in a supply or fabrication chain of the electronic object). In various embodiments, classification of the electronic object with respect to a counterfeit detection may comprise comparing the THz fingerprint of the electronic objects to other THz fingerprints of similar electronic objects of the same object design. In various embodiments, classification of the electronic object may comprise comparing the THz fingerprint of the electronic object to simulated THz fingerprints and/or other simulated values. For example, THz fingerprints and/or other values may be simulated using computer aided design (CAD) electromagnetic synthesis.

In accordance with some embodiments of the present invention, a method for classifying an electronic object includes, in part, capturing, using at least one of a first imaging system or a Fourier transform infrared spectroscopy (FTIR), a first set of observed data for the electronic object, wherein the first set of observed data comprises external physical characteristic data of the electronic object; determining, based at least in part on the first set of observed data for the electronic object, whether the electronic object is associated with information stored in an object database; responsive to determining that the electronic object is associated with information stored in the object database, capturing, using at least a terahertz (THz) data collection or imaging system, a second set of observed data for the electronic object; generating a THz fingerprint for the electronic object based at least in part on the second set of observed data; and generating and assigning a classification for the electronic object based at least in part on a comparison of the THz fingerprint for the electronic object with the information stored in the object database associated with the electronic object. In some embodiments, the THz fingerprint comprises frequency spectra and phase information of THz signals observed from the electronic object via the THz time domain spectroscopy. In some embodiments, the THz signals is obtained by configuring the THz time domain spectroscopy to perform at least one of a raster scan or a point scan of the electronic object.

In some embodiments, the information stored in the object database associated with the electronic object includes, in part, an earlier THz fingerprint for the electronic object generated at an earlier point in time. In other embodiments, the information stored in the object database associated with the electronic object includes, in part, a THz fingerprint for an object design of the electronic object generated based at least in part on observed data for a plurality of electronic objects of the same object design.

In some embodiments, the method for classifying an electronic object further includes, in part, performing at least one classification-based action. In some embodiments, the at least one classification-based action is selected based at least in part on the classification. In some embodiments, the at least one classification-based action comprises capturing a third set of observed data for the electronic object and storing the third set of observed data in the object database. In some embodiments, the third set of observed data comprises user input data.

In some embodiments, the first set of observed data for the electronic object further includes, in part, a FTIR spectrum for the electronic object. In some embodiments, generating and assigning the classification for the electronic object is further based at least in part on a comparison of the FTIR spectrum for the electronic object with the information stored in the object database associated with the electronic object.

In some embodiments, the method for classifying an electronic object further includes, in part, generating a first set of synthetic measurement data associated with the electronic object and storing the first set of synthetic measurement data in the object database. In some embodiments, the first set of synthetic measurement data is generated based at least in part on the second set of observed data and the FTIR spectrum. In some embodiments, the first set of synthetic measurement data is generated using a generative adversarial network.

In some embodiments, the method for classifying an electronic object further includes, in part, responsive to determining that the electronic object is not associated with information stored in the object database, capturing a fourth set of observed data for the electronic object and storing the fourth set of observed data in the object database.

In some embodiments, the THz data collection or imaging system is configured based at least in part on the first set of observed data and/or the information stored in the object database associated with the electronic object.

In accordance with some embodiments of the present invention, a system for classifying an electronic object includes, in part, a terahertz (THz) data collection or imaging system configured to at least capture THz data based at least in part on observing THz signals from an object, at least one of a non-THz data collection or imaging system or a Fourier transform infrared spectroscopy (FTIR), and an apparatus comprising at least one memory and at least one processor, the at least one memory comprising computer program code.

In some embodiments, the at least one memory and the computer program code are configured to cause the at least one processor to capture, using the at least one of a non-THz data collection or imaging system or a FTIR, a first set of observed data for the electronic object, wherein the first set of observed data comprises external physical characteristic data of the electronic object; determine, based at least in part on the first set of observed data for the electronic object, whether the electronic object is associated with information stored in an object database; responsive to determining that the electronic object is associated with information stored in the object database, capture, using at least the THz data collection or imaging system, a second set of observed data for the electronic object, wherein the THz data collection or imaging system is configured based at least in part on the first set of observed data and/or the information stored in the object database associated with the electronic object; generate a THz fingerprint for the electronic object based at least in part on the second set of observed data; and generate and assign a classification for the electronic object based at least in part on the THz fingerprint for the electronic object and the information stored in the object database associated with the electronic object.

In some embodiments, the THz fingerprint comprises frequency spectra and phase information of THz signals observed from the electronic object via THz time domain spectroscopy. In some embodiments, the THz signals is obtained by configuring the THz time domain spectroscopy to perform a raster scan of the electronic object. In some other embodiments, the THz signals is obtained by configuring the THz time domain spectroscopy to perform a point scan of the electronic object.

In some embodiments, the information stored in the object database associated with the electronic object comprises an earlier THz fingerprint for the electronic object generated at an earlier point in time. In other embodiments, the information stored in the object database associated with the electronic object comprises a THz fingerprint for an object design of the electronic object generated based at least in part on observed data for a plurality of electronic objects of the same object design.

In some embodiments, the at least one memory and the computer program code are further configured to cause the at least one processor to perform at least one classification-based action, wherein the at least one classification-based action is selected based at least in part on the classification.

In some embodiments, the first set of observed data for the electronic object further comprises a FTIR spectrum for the electronic object. In some embodiments, generating and assigning the classification for the electronic object is further based at least in part on a comparison of the FTIR spectrum for the electronic object with the information stored in the object database associated with the electronic object.

In some embodiments, the at least one memory and the computer program code are further configured to cause the at least one processor to generate a first set of synthetic measurement data associated with the electronic object and store the first set of synthetic measurement data in the object database. In some embodiments, the first set of synthetic measurement data is generated based at least in part on the second set of observed data and the FTIR spectrum. In some embodiments, the first set of synthetic measurement data is generated using a generative adversarial network.

In some embodiments, the at least one memory and the computer program code are further configured to cause the at least one processor to, responsive to determining that the electronic object is not associated with information stored in the object database, capture a fourth set of observed data for the electronic object and storing the fourth set of observed data in the object database.

BRIEF DESCRIPTION OF THE DRAWINGS

Having thus described the present disclosure in general terms, reference will now be made to the accompanying drawings, which are not necessarily drawn to scale. The figures are used to provide knowledge and understanding of embodiments of the disclosure and do not limit the scope of the disclosure to these specific embodiments.

Figure 1:
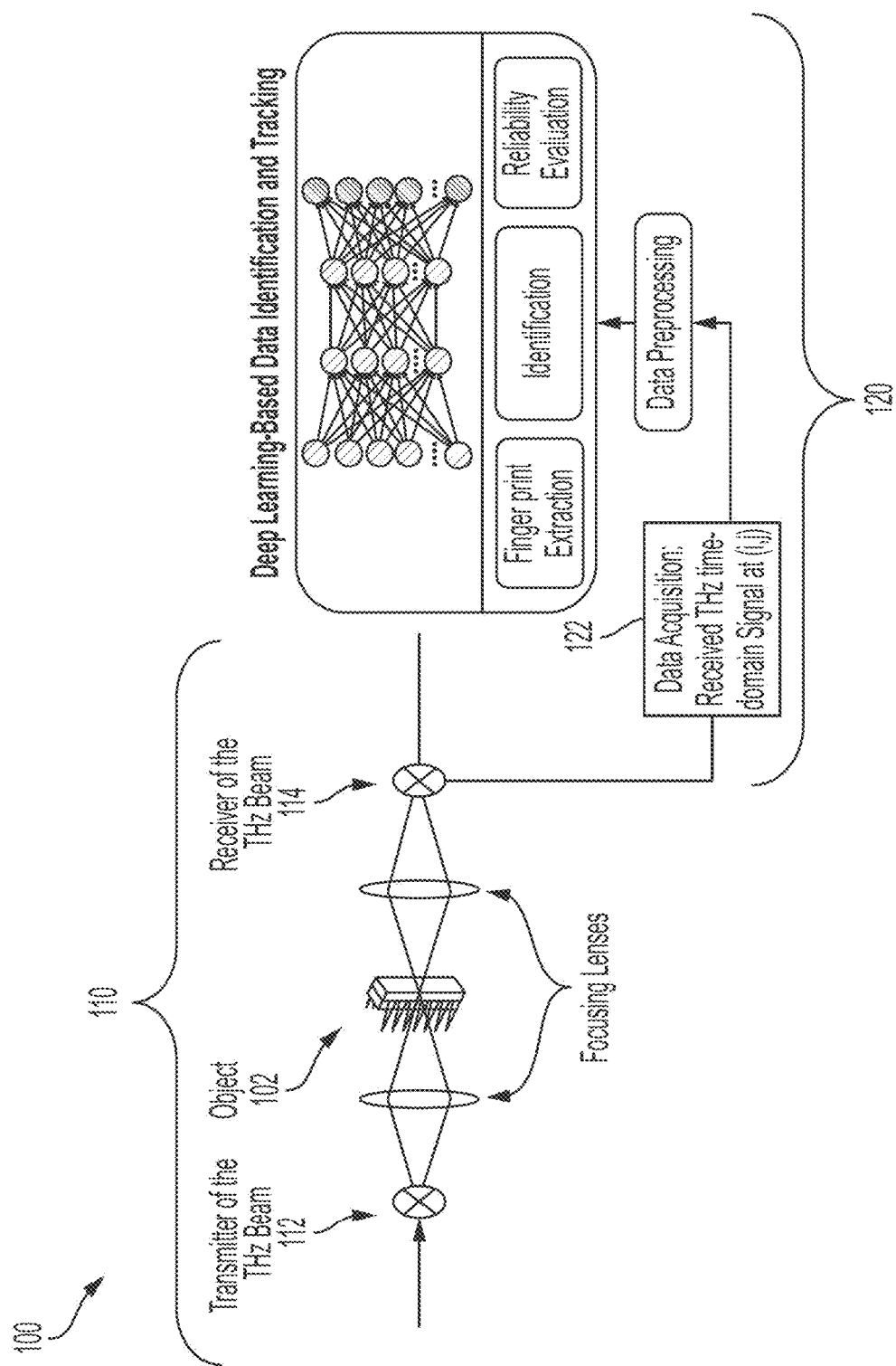

FIG. 1 provides a diagram of a system architecture that may be used in conjunction with various embodiments of the present disclosure.

Figure 2:
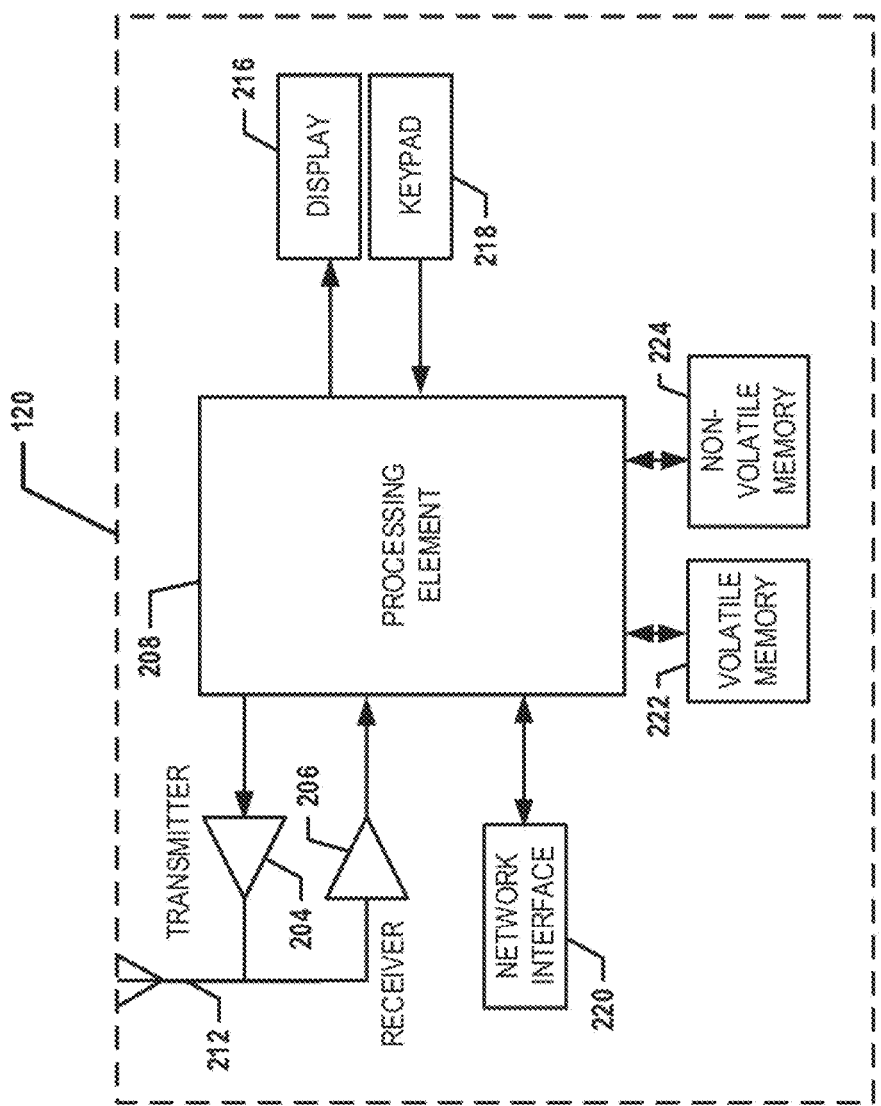

FIG. 2 provides a diagram of a system computing entity in accordance with various embodiments of the present disclosure.

Figure 3:
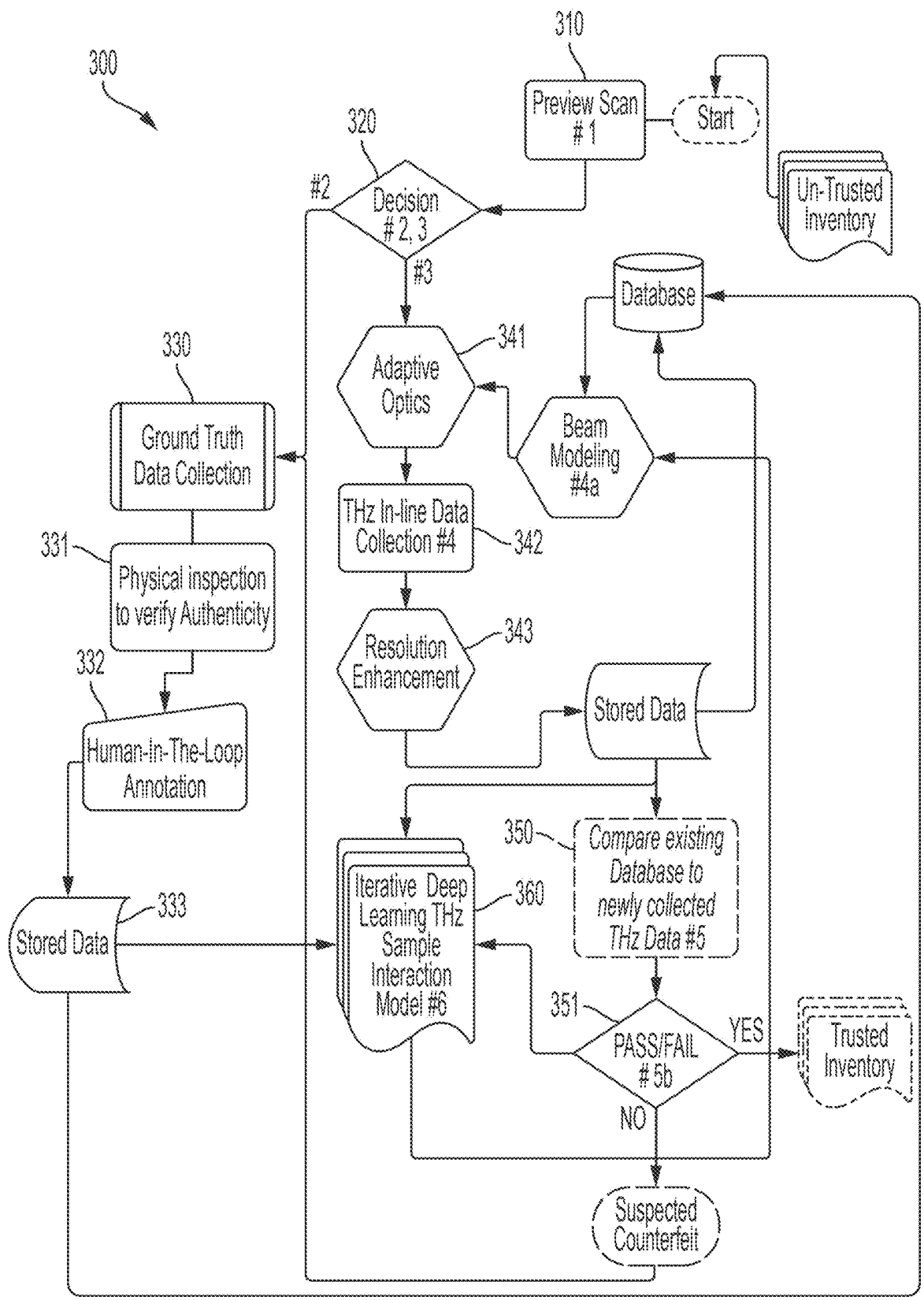

FIG. 3 provides a process flow for classifying and evaluating an object based at least in part on collecting terahertz (THz) data, in accordance with one embodiment of the present invention.

FIGS. 4A and 4B show optical images of two exemplary electronic objects, in accordance with one embodiment of the present invention.

FIGS. 4C and 4D show X-ray images of the two exemplary electronic objects in FIGS. 4A and 4B, respectively, in accordance with one embodiment of the present invention.

FIGS. 4E and 4F show THz images for the two exemplary electronic objects in FIGS. 4A and 4B, respectively, in accordance with one embodiment of the present invention.

Figure 5A:
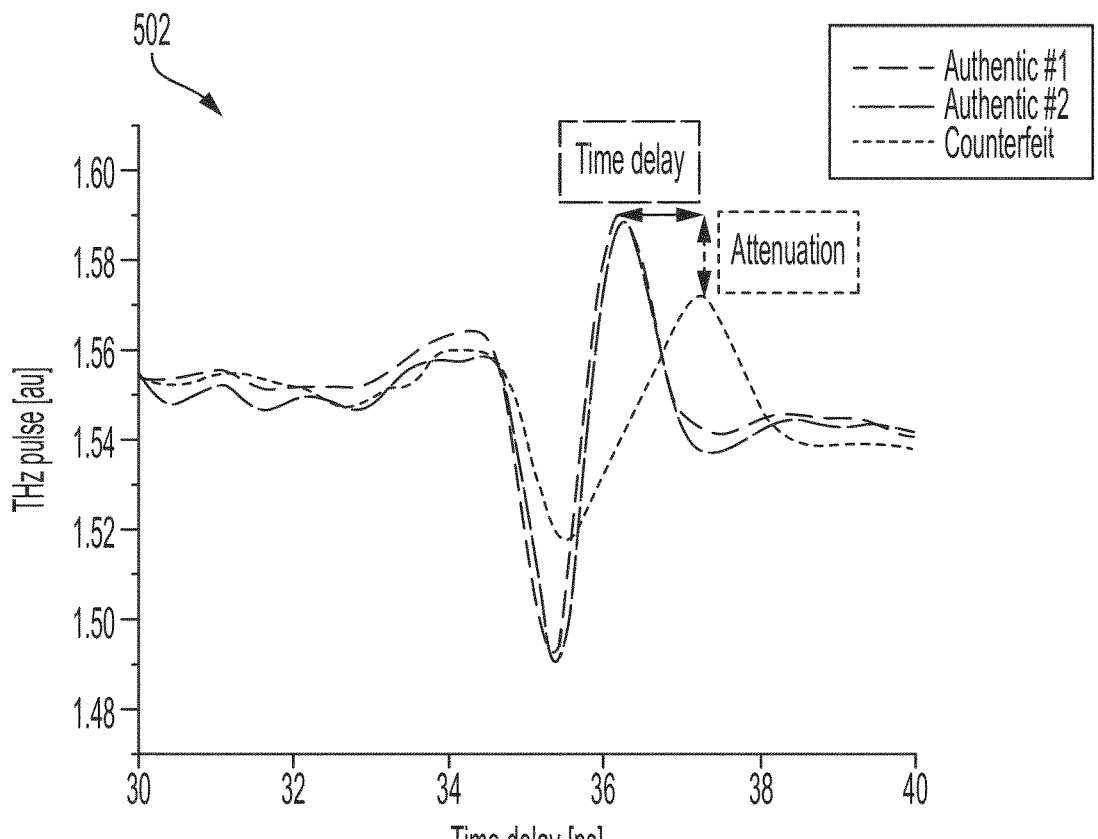
Figure 5B:
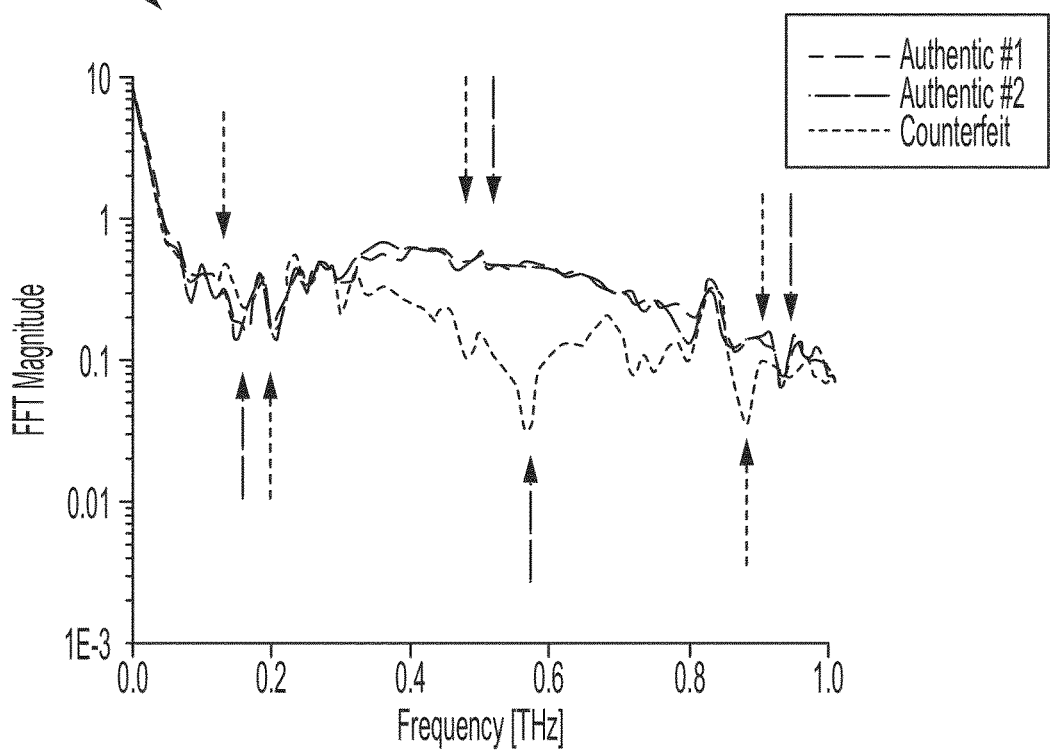

FIGS. 5A and 5B illustrates THz fingerprints for three exemplary electronic objects, in accordance with one embodiment of the present invention.

Figure 6:
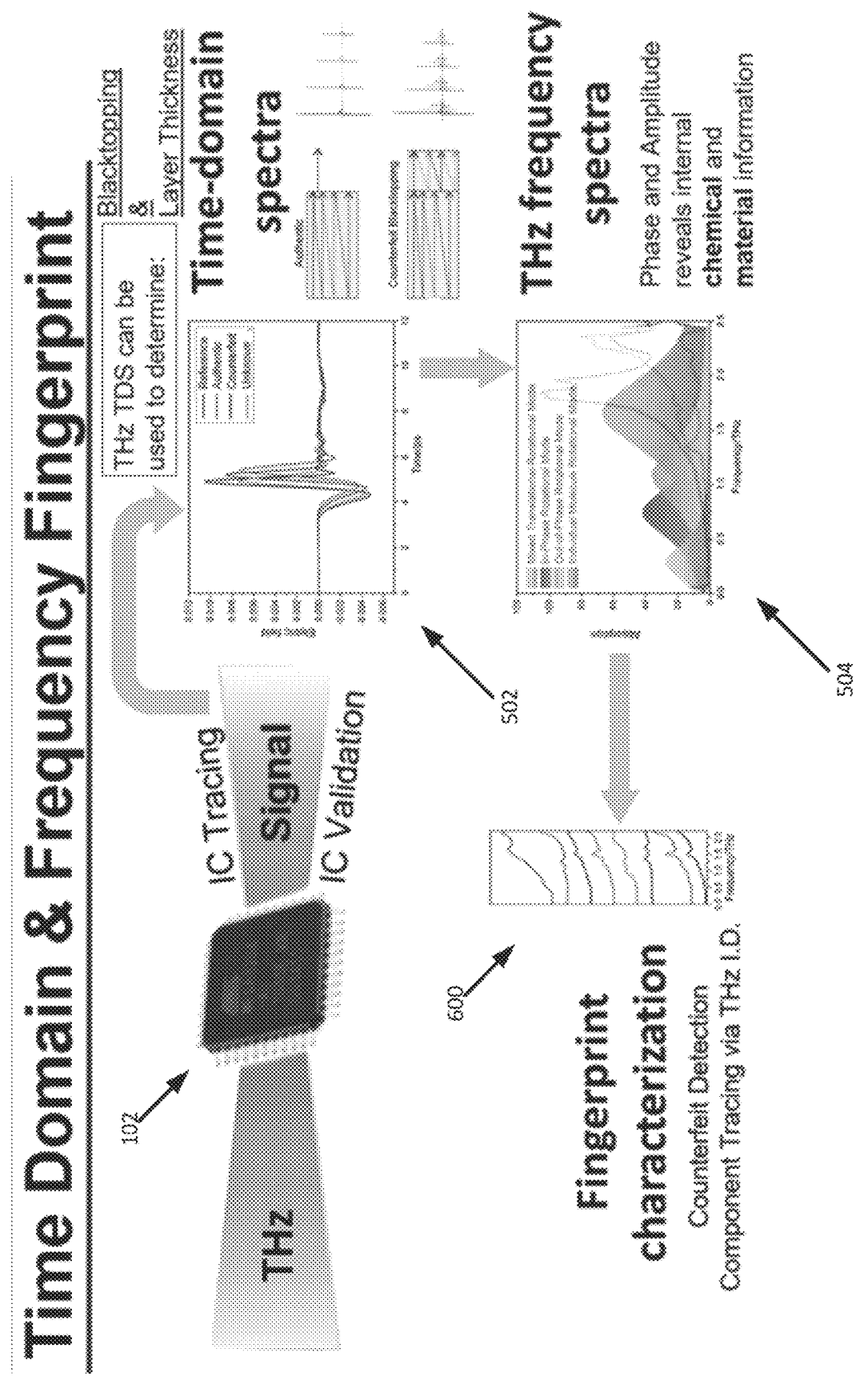

FIG. 6 illustrates THz fingerprints for an exemplary electronic object, in accordance with one embodiment of the present invention.

Figure 7:
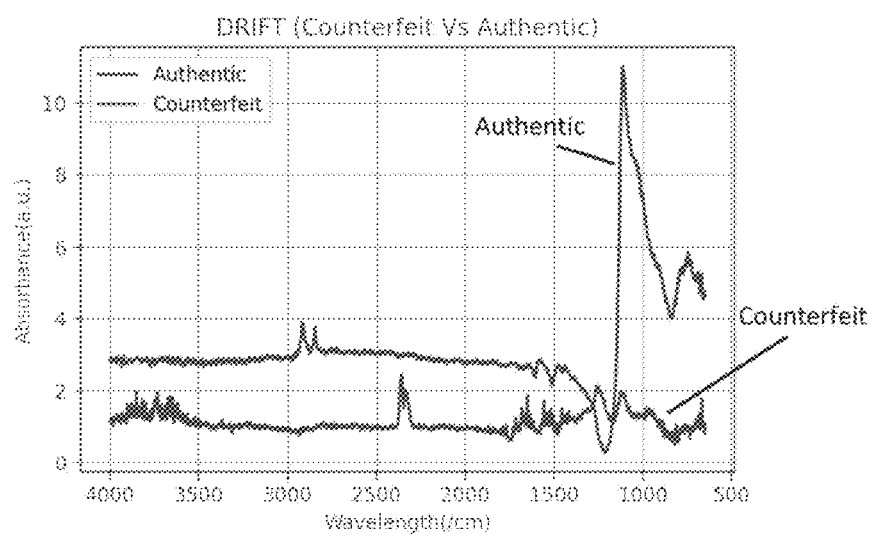

FIG. 7 illustrates Diffuse Reflectance Infrared Fourier Transform Spectroscopy (DRIFT) spectrums of an exemplary authentic sample and an exemplary counterfeit sample, in accordance with one embodiment of the present invention.

Figure 8:
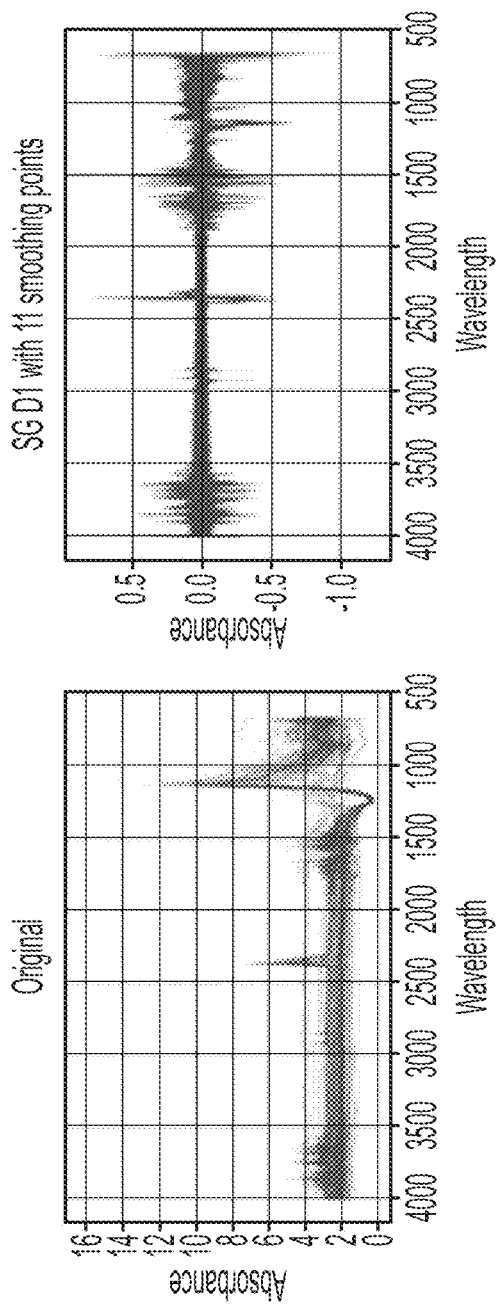
Figure 8:
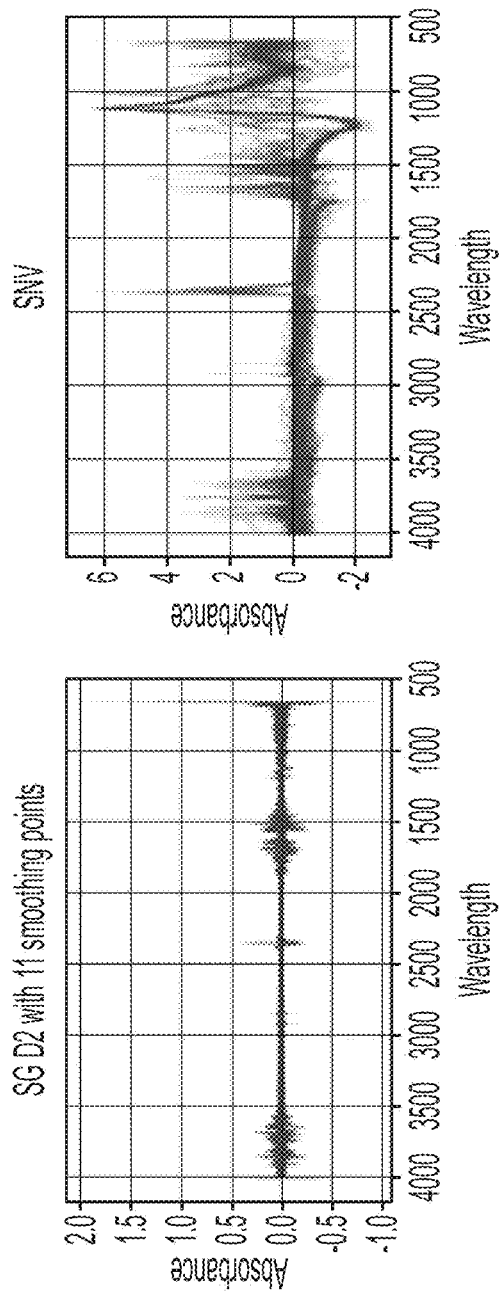
Figure 8:
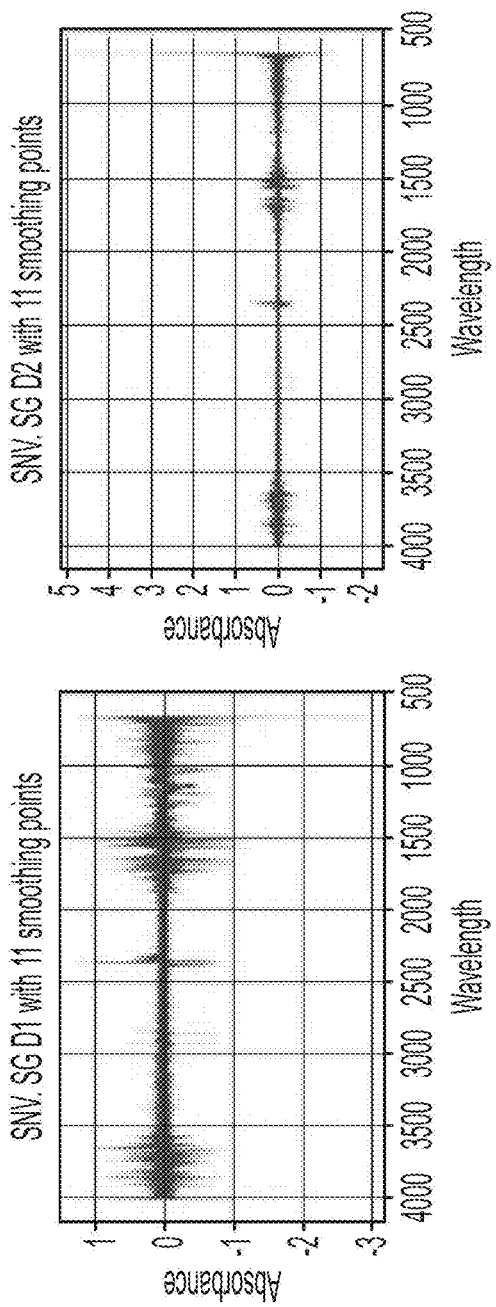

FIG. 8 shows the results of applying different exemplary data preprocessing methods to an exemplary Fourier Transform Infrared spectroscopy (FTIR) spectrum, in accordance with one embodiment of the present invention.

Figure 9:
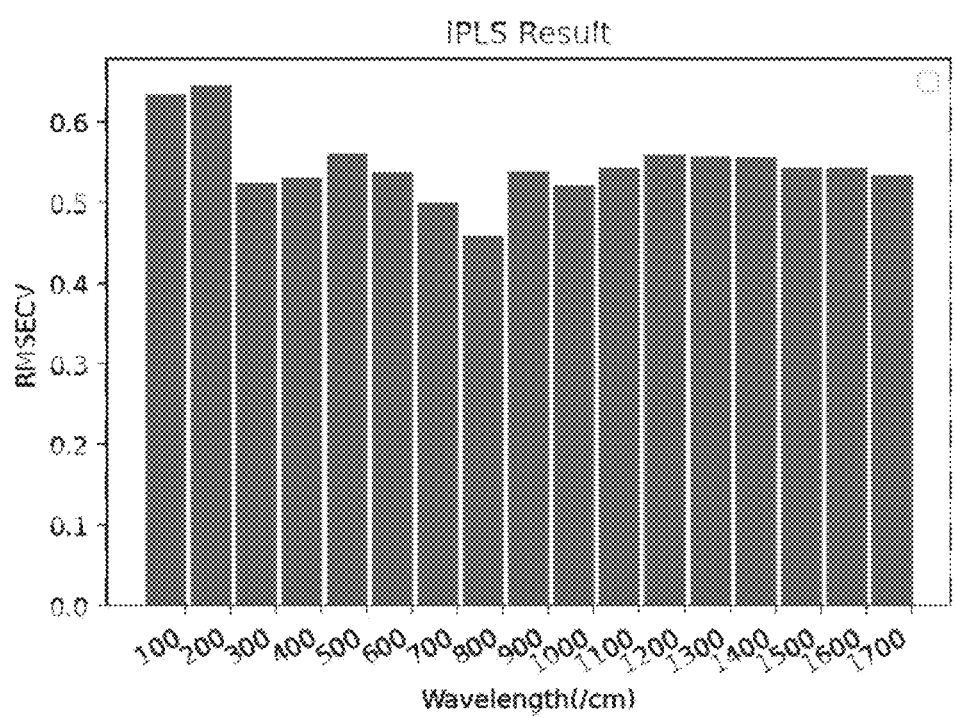

FIG. 9 shows the root mean square error 3-fold cross-validation (RMSECV) result from interval Partial Least-Squares (iPLS) of an exemplary FTIR spectrum, in accordance with one embodiment of the present invention.

Figure 10:
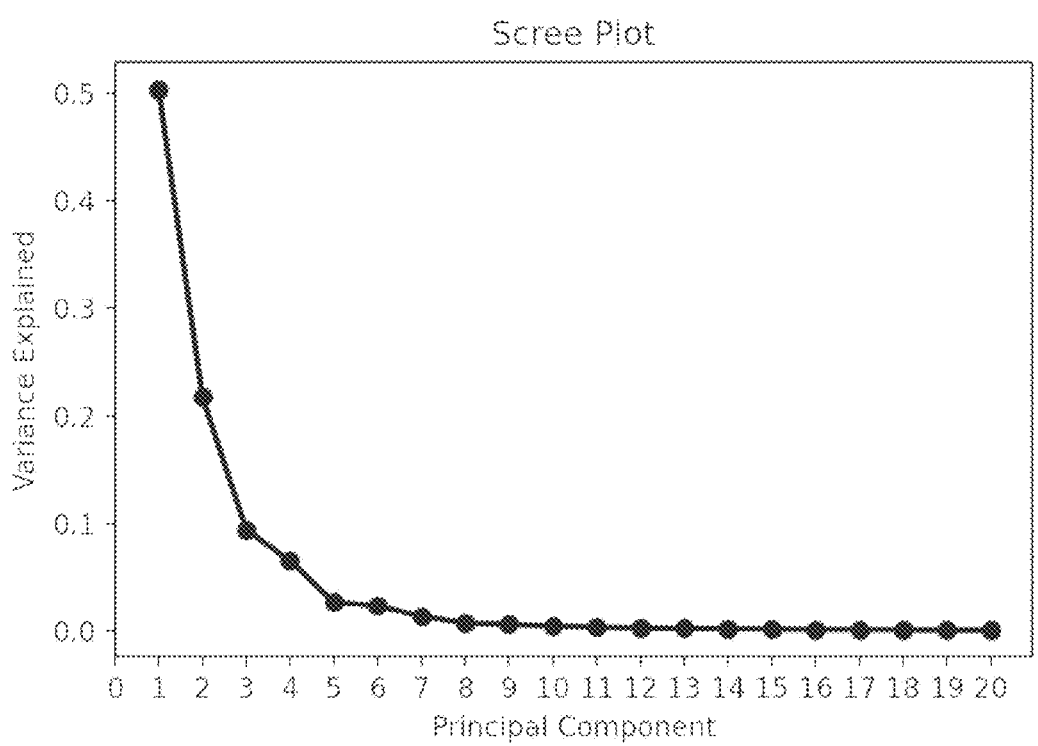

FIG. 10 shows the result of applying principal component analysis (PCA) to an exemplary FTIR spectrum, in accordance with one embodiment of the present invention.

Figure 11:
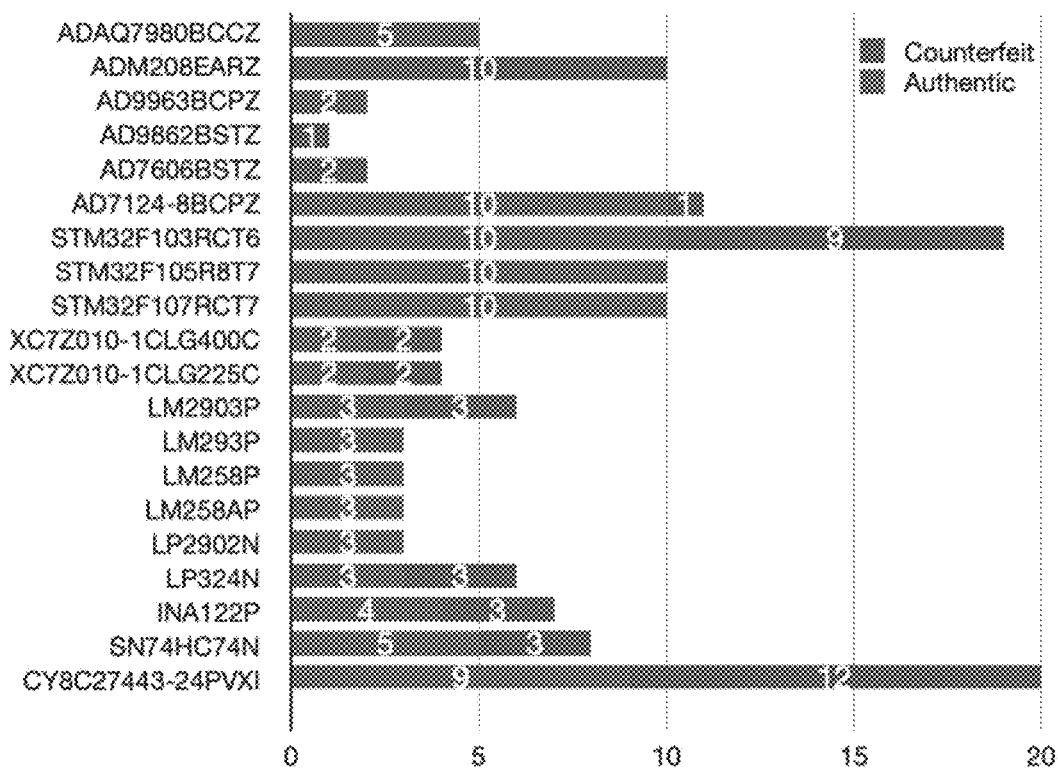

FIG. 11 shows the types of integrated circuits (ICs) used in an experiment, in accordance with one embodiment of the present invention.

FIG. 12A shows global counterfeit detection results, in accordance with one embodiment of the present invention.

FIG. 12B shows individual counterfeit detection results, in accordance with one embodiment of the present invention.

DETAILED DESCRIPTION OF SOME EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. General Overview and Technical Advantages

Various embodiments of the present disclosure leverage terahertz (THz) radiation in systems and methods for non-destructive supply chain inspection. THz radiation, THz signals, THz frequencies, THz wavelengths, and/or the like, are defined as having frequencies between 300 GHz to 10 THz. The THz wavelength can penetrate plastic, ceramic, and other packaging materials, enabling reflection- and transmission-based data collection and/or imaging. The THz wavelength can penetrate various materials to certain depths, such as a few millimeters, which is approximately the same depth as typical electronic object packaging. Existing transmission-based imaging methods, such as 2D X-ray or radar- and reflection-based optical or infrared imaging, are not capable of collecting high quality simultaneous volumetric and chemical information capable of supply chain inspection, unique package characterization, and/or counterfeit detection.

In various embodiments, THz radiation and THz data collection are applied to electronic object inspection. In various embodiments, electronic objects such as transistors, integrated circuits (ICs), printed circuit boards (PCBs), and/or other integral parts of PCB function, are inspected with THz radiation and THz data collection. THz-based electronic object inspection provides various technical advantages over existing electronic object inspection methods because (i) THz wavelengths (e.g., ranging from approximately 0.1 mm to approximately 1 mm) are comparable to typical electronic object (e.g., an IC) dimensions to be measured, and (ii) packaging materials of electronic objects are almost transparent to THz data collection and/or imaging at frequencies below approximately 1 THz. With the THz region of the electromagnetic spectrum being defined between 300 GHz to 10 THz, THz frequencies typically lie between electronic frequencies and optical frequencies. It may then be appreciated by those of skill in the field to which the present disclosure pertains that THz frequencies exist between transistor oscillation frequencies and optical device (e.g., infrared emitter) frequencies or visible light radiation.

Furthermore, THz radiation is non-ionizing, and therefore, various embodiments with THz data collection and/or imaging provide technical advantages over existing methods, such as X-ray-based inspection methods and gamma-based inspection methods which are both ionizing and expensive. Thus, various embodiments may be less human dependent and in general, may also be portable and faster. As mentioned, various embodiments with THz data collection and/or imaging are non-destructive electronic object inspection methods, also providing technical advantages over existing methods of destructive inspection methods which may be restricted from inspecting certain electronic objects.

Most materials have unique spectral fingerprints in the THz spectral region. Hence, THz radiation can be used for detecting and identifying materials in a wide variety of objects, from medicines to electronic components. Furthermore, THz radiation is strongly absorbed by hydrated materials, such as mishandled electronic objects. Various embodiments specifically use this uniqueness to provide an authentication platform to distinguish between authentic and counterfeit electronic objects and enable detection of defective and compromised electronic objects. THz spectral data may be collected using THz time domain spectroscopy (THz-TDS), which offers material detection as well as better spatial resolution, better spectral resolution, and faster data acquisition compared to existing electronic object inspection methods, such as ultrasound-based inspection. In various embodiments, waveguiding methods and machine learning methods are implemented to further increase spatial and spectral resolution of collected THz data. For example, machine learning may be used to predict how THz beams or radiation may interact or propagate through an electronic object, and waveguiding may be configured based at least in part on such predictions. Even further, machine learning may also be used to aggregate collected THz data and to perform rapid aggregate analysis of different (e.g., counterfeit and genuine) THz radiation profiles in the collected THz data. As such, the use of machine learning enables the determination and application of relationships of data points between different electronic object samples in collected THz data.

Various embodiments of the present disclosure enable rapid, simultaneous, parallel, and/or the like, verification of electronic objects, and may be applied during a supply chain (e.g., fabrication or production) of electronic objects. In some instances, approximately 200,000 components of varying shape, size, and complexity may be integrated per hour using pick-and-place machines, and may be packaged in reels and sealed with plastic until integration by a high-speed robot. Furthermore, electronic object supply chains may span multiple countries and involve multiple parties, making risks of defects, inclusions, or malicious modifications (e.g., hardware Trojans) inherent in the fabrication or production of electronic objects. Various embodiments then fill a technical need that exists for rapid and efficient electronic object inspection within a supply chain to monitor for defective or counterfeit electronic objects. Various embodiments also provide technical improvements to existing methods that are incapable of verifying a high number of components in a reel during production rapidly or together in a batch. Various embodiments may use in-line THz data collection, meaning that THz data for an electronic object is collected as the electronic object traverses through production (e.g., data collection within a semiconductor manufacturing fabrication environment).

Various embodiments of the present disclosure provide further technical improvements to existing methods that require modification during fabrication of ICs. For example, existing inspection methods modify an electronic object by integrating a radio frequency identification (RFID) or THz tag, or dielectric structure, into the electronic object and detecting unique radio frequency (RF) or THz signals emitted from the tag in the electronic object. As will be understood, integrating such tags may result in undesired effects to the electronic object. Furthermore, such existing methods rely upon implementing such tags during fabrication of the electronic objects, but meanwhile cannot be used to inspect old electronic objects or electronic objects already fabricated. Such tags additionally cannot be used for the inspection of objects or devices that require later assembly (e.g., consumer-end assembly devices, out-of-house product requirements). Various embodiments of the present disclosure provide THz-based inspection methods that do not require modification of electronic objects during production or fabrication of the electronic objects.

Various embodiments of the present disclosure may also be self-learning at least to an extent based at least in part on a combination of electronic object design knowledge, signal processing, and iterative learning. In various embodiments, background information of the electronic object, including design knowledge, images from other modalities, and physics-based simulations of generic software models, are used to optimize the collection of THz data and signal processing of the THz data. Self-learning may be further used to trace mishandling of an electronic object back to a source in a supply chain, to provide blockchain traceability for manufacturers and assemblers in a supply chain, to quantify environmental exposures such as humidity or corrosion in a supply chain, and to meet high volume requirements for in-line inspection. Self-learning or machine learning methods may also be used to enhance THz fingerprints based at least in part on THz data and detect features within THz fingerprints that may be obscured. For example, principal component analysis (PCA) may be used and/or combined with other machine learning techniques to detect correlations between features in different THz fingerprints or in other collected data.

Various embodiments implement artificial intelligence (AI) to enable generation of a large amount of high quality data in a very rapid manner. For example, machine learning methods can also be used for beamforming and efficient data detection in generalized index modulation schemes. Feature extraction and classification may be conducted via principal component analysis (PCA) and a support vector machine, or approximate entropy and a deep neural network, respectively. Furthermore, various embodiments comprising machine learning methods may enable THz-based localization, for map interpolation and extrapolation as well as for cooperative localization and multi-source data fusion.

Thus, the present disclosure provides various embodiments for AI-enhanced THz data collection, processing, and derived fingerprint methodology to create a truly unique THz fingerprint for an electronic object based at least in part on the natural structure of the electronic object, manufacturing variations, and handling conditions. These unique THz fingerprints consist of electrical, structural, and chemical information for the electronic objects. Various embodiments enable verification of simple to complex electronic object designs. For example, various embodiments are configured to inspect PCBs comprising multiple IC components to verify the many electrical connections within a PCB. In various embodiments, THz data collection and/or imaging enables inspection of electronic objects at transistor, gate, interconnect, assembled device (e.g., PCB), and system (e.g., smartphone) levels. Various embodiments may therefore enable blockchain tracking technologies where an electronic object can be fingerprinted before and after entering an untrusted supply chain. Various embodiments may identify THz fingerprints with high confidence, and use an identified altered THz fingerprint to identify a source of manipulation. For example, THz fingerprints of a batch of ICs may change or be altered due to environmental or handling conditions.

II. Exemplary Computer Program Products

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FcRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

Referring now to FIG. 1, a system 100 is provided for classifying and evaluating an electronic object 102. The system 100 comprises a terahertz (THz) data collection or imaging system 110. In various embodiments, the THz data collection and/or imaging system 110 is configured to perform THz time domain spectroscopy (THz-TDS) for an electronic object 102. To perform THz-TDS, the THz data collection and/or imaging system 110 is configured to generate and receive THz beams, signals, pulses, waves, and/or similar terms used interchangeably herein. For example, the THz data collection and/or imaging system 110 comprises a THz transmitter 112 configured to generate and transmit THz beams. Specifically, the THz transmitter 112 may be configured to transmit THz beams at and/or through the electronic object 102. In some embodiments, the THz transmitter 112 may be configured to transmit THz beams at a portion of or the whole area on one surface of the electronic object 102 to form a raster scan. In other embodiments, the THz transmitter 112 may be configured to transmit THz beams at a plurality of points on one surface of the electronic object 102 (alternatively referred to herein as a point scan). The plurality of points may comprise random points in some embodiments. The THz data collection and/or imaging system 110 may further comprise a THz receiver 114 configured to receive THz beams (e.g., from the electronic object 102, from the THz transmitter 112 through the electronic object 102).

In various embodiments, the THz data collection and/or imaging system 110 is configured to recording time-domain data of THz beams or signals received at the THz receiver 114. Specifically, time-domain THz data may describe the intensity of THz signals in relation to various timepoints. Thus, time-domain THz data may also be understood as comprising phase and intensity data of received THz signals. Time-domain THz data obtained or captured from the THz data collection and/or imaging system 110 may describe various aspects of the electronic object 102, such as refractive index, absorption coefficient, thickness of the layers of the electronic object 102, and/or the like.

In various embodiments, the system 100 comprises a system computing entity 120 configured to receive time-domain THz data from the THz data collection and/or imaging system 110. In some embodiments, the system computing entity 120 comprises a data acquisition module 122 configured to receive time-domain THz data from the THz data collection and/or imaging system 110.

The system computing entity 120 is further configured to perform various data preprocessing and other tasks. For instance, the system computing entity 120 is configured to perform Fast Fourier Transform operations with the time-domain THz data (e.g., received via data acquisition module 122) to obtain THz spectrum data, or frequency-domain THz data. The system computing entity 120 is further configured to perform fingerprint extraction, which may comprise generating a unique fingerprint or signature for the electronic object 102 based at least in part on the frequency-domain THz data. The unique material composition of the electronic object 102 causes the frequency-domain THz data to have unique features (e.g., shape of the spectrum, amplitude dips), thus a THz fingerprint based at least in part on frequency-domain THz data may uniquely identify or classify the electronic object 102. In various embodiments, the THz fingerprint may also be based at least in part on the time-domain THz data.

The system computing entity 120 may store other frequency-domain THz data or THz fingerprints, and may be configured to classify and evaluate the electronic object 102 based at least in part on comparing the generated THz fingerprint for the electronic object 102 to other THz fingerprints or frequency-domain THz data. The system computing entity 120 may be configured to identify the electronic object 102 based at least in part on the generated THz fingerprint for the electronic object 102 using machine learning and artificial intelligence models. For example, a deep learning network is used to classify the generated THz fingerprint for the electronic object 102, or various features (e.g., shape, dips, peaks) of the generated THz fingerprint.

The system computing entity 120 may be further configured to evaluate the reliability of the electronic object 102 based at least on the generated THz fingerprint for the electronic object 102. The behavior of an electronic object 102 may undergo changes due to the variations in external and internal conditions (e.g., aging, heat, ambient moisture). Thus, for example, the generated THz fingerprint for the electronic object 102 may be compared to another THz fingerprint for the electronic object 102 previously generated at an earlier point in time (e.g., before any variations due to external and internal conditions). Therefore, the system computing entity 120 may be configured to perform or utilize a reliability evaluation and repeatability for extracting and explaining the variations in the THz fingerprint for the electronic object 102 and improving the results from stand-alone THz fingerprinting. The variations in the THz fingerprint may depend on or be the result of (i) time of fly delay of the THz beam, (ii) the points of THz beam insertion (e.g., by the THz transmitter 112) and the signal collection (e.g., by the THz receiver 114), (iii) moisture on the electronic object 102, (iv) applied temperature on the electronic object 102, and/or the like. In some embodiments, the system computing entity 120 is configured to perform various data analysis algorithms enabling measurement and evaluation of a THz fingerprint.

In various embodiments, a reliability evaluation mechanism includes prediction models built by machine/deep learning techniques and statistical measures. These prediction models may be configured to study the relationships between THz fingerprints and certain auxiliary parameters. The reliability evaluation mechanism may be configured to execute or perform various reliability functions such as (i) generating or acquiring THz fingerprints for the object 102 under multiple operating conditions (e.g., by modifying, configuring, controlling, and/or the like, the THz data collection and/or imaging system 110), (ii) comparing such THz fingerprints with certain measures to determine their closeness and relationships, and (iii) determining the reliable THz fingerprints to be positioned into the THz validation database for future analysis.

Thus, the system computing entity 120 may identify the electronic object 102 based at least in part on a generated THz fingerprint for the electronic object 102, and further provide reliability information (e.g., in view of factors such as humidity in ambient environment, aging, temperature) also based at least in part on the generated THz fingerprint. This reliability information plays an important role in the lifecycle of an electronic object 102 as the electronic object 102 travels long distances in a supply chain and operates in a wide variety of temperature and environmental conditions. In various embodiments, repeated generation of THz fingerprints for an electronic object 102 (e.g., at different points in time while the electronic object 102 is in a supply chain) may reveal a history of the electronic object 102 while travelling in a supply chain. As such, the system computing entity 120 is configured to implement and utilize machine learning and artificial intelligence models to (i) generate reports or information of the history of the electronic object 102 in the supply chain and/or in operation, and (ii) identify the origin of the electronic object 102.

IV. Exemplary Computing Entity

FIG. 2 provides an illustrative schematic representative of a system computing entity 120 that can be used in conjunction with embodiments of the present disclosure. For instance, the system computing entity 120 may be the system computing entity 120 configured to receive data from a THz data collection and/or imaging system 110 and perform various other tasks within the system 100 previously described in FIG. 1. In general, the terms device, system, computing entity, entity, and/or similar words used herein interchangeably can refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 2, the system computing entity 120 can include an antenna 212, a transmitter 204 (e.g., radio), a receiver 206 (e.g., radio), and one or more processing elements 208 that provides signals to and receives signals from the transmitter 204 and receiver 206, correspondingly.

The signals provided to and received from the transmitter 204 and the receiver 206, correspondingly, can include signaling information/data in accordance with air interface standards of applicable wireless systems. In this regard, the system computing entity 120 can be capable of operating with one or more air interface standards, communication protocols, modulation types, and access types. More particularly, the system computing entity 120 can operate in accordance with any of a number of wireless communication standards and protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The system computing entity 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

With that said, the system computing entity 120 may be configured in particular embodiments to operate in accordance with multiple wired communication standards and protocols via a network interface 220 instead of or in addition to wireless systems. Here, any one or a combination of different types of suitable communications networks can be used such as, for example, cable networks, public networks, private networks, or any other suitable private and/or public networks. Further, the networks may have any suitable communication range associated therewith and may include, for example, global networks, MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, or any combination thereof, as well as a variety of network devices and computing platforms provided by network providers or other entities. Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol.

In various embodiments, the system computing entity 120 includes or is in communication with one or more processing elements 208 (also referred to as processors, processing circuitry, and/or similar terms used herein interchangeably) that communicate with other elements within the system computing entity 120 via a bus, for example, or network connection. As will be understood, the processing element 208 may be embodied in several different ways. For example, the processing element 208 may be embodied as one or more complex programmable logic devices (CPLDs), microprocessors, multi-core processors, coprocessing entities, application-specific instruction-set processors (ASIPs), and/or controllers. Further, the processing element 208 may be embodied as one or more other processing devices or circuitry. The term circuitry may refer to an entirely hardware embodiment or a combination of hardware and computer program products. Thus, the processing element 208 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 208 may be configured for a particular use or configured to execute instructions stored in volatile or non-volatile media or otherwise accessible to the processing element 208. As such, whether configured by hardware, computer program products, or a combination thereof, the processing element 208 may be capable of performing steps or operations according to embodiments of the present disclosure when configured accordingly.

In various embodiments, the system computing entity 120 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 224 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 224 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium. In particular embodiments, the memory media 224 may also be embodied as a data storage device or devices, as a separate database server or servers, or as a combination of data storage devices and separate database servers.

In various embodiments, the system computing entity 120 may further include or be in communication with volatile media (also referred to as volatile storage, memory, memory storage, memory circuitry and/or similar terms used herein interchangeably). For instance, the volatile storage or memory may also include one or more volatile storage or memory media 222 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 222 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 208. Thus, the databases, database instances, database management system entities, data, images, applications, programs, program modules, scripts, source code, object code, byte code, compiled code, interpreted code, machine code, executable instructions, and/or the like may be used to control certain aspects of the operation of the system computing entity 120 with the assistance of the processing element 208 and operating system. The system computing entity 120 may be configured to download changes, add-ons, and updates, for instance, to its firmware, software (e.g., including executable instructions, applications, program modules), and operating system.

The system computing entity 120 can also comprise a user interface (that can include a display 216 coupled to the processing element 208) and/or a user input interface (coupled to the processing element 208). For example, the user interface can be a user application, browser, user interface, graphical user interface, dashboard, and/or similar words used herein interchangeably executing on and/or accessible via the system computing entity 120 to interact with and/or cause display of information/data. The user input interface can comprise any of a number of devices or interfaces allowing the system computing entity 120 to receive data, such as a keypad 218 (hard or soft), a touch display, voice/speech or motion interfaces, or other input device. In embodiments including a keypad 218, the keypad 218 can include (or cause display of) the conventional numeric (0-9) and related keys (#, *), and other keys used for operating the system computing entity 120 and can include a full set of alphabetic keys or set of keys that can be activated to provide a full set of alphanumeric keys. In addition to providing input, the user input interface can be used, for example, to activate or deactivate certain functions.

As will be appreciated, one or more of the system computing entity's components may be located remotely from other system computing entity components, such as in a distributed system. Furthermore, one or more of the components may be aggregated and additional components performing functions described herein may be included in the system computing entity 120. Thus, the system computing entity 120 can be adapted to accommodate a variety of needs and circumstances.

V. Exemplary System Operations

Referring now to FIG. 3, a flowchart is provided. The flowchart illustrates an example process 300 for classifying and evaluating an electronic object 102 based at least in part on THz data collection and/or imaging. In various embodiments, operations of the example process 300 are performed by a system computing entity 120, such as the example system computing entity provided by FIG. 2. For example, system computing entity comprises means, such as processing element 208, memories 222, 224, network interface 220, and/or the like, for performing various operations of the example process 300.

Preview Scan and Background Information

In one embodiment, the process 300 begins with operation 310. Operation 310 comprises performing a preview scan of the electronic object 102. The electronic object 102 may be obtained or received from an un-trusted inventory of electronic objects. The preview scan of the electronic object 102 may be performed using rapid imaging modalities, such as laser-based, digital, and/or optical imaging. For example, the preview scan of the electronic object 102 is performed by an imaging modality faster than THz imaging and image acquisition. In various embodiments, the preview scan is performed to obtain or extract general and physical information about the electronic object 102. For example, the preview scan is performed to identify a manufacturer logo printed on the electronic object 102, various text printed on the electronic object 102, surface damage on the electronic object 102, the number of pins of the electronic object 102 (e.g., an IC), the size and/or thickness of the electronic object 102, and/or the morphology of the electronic object 102.

FIGS. 4A and 4B illustrate respectively an example electronic object 102A and an example electronic object 102B. For example, FIGS. 4A and 4B provide optical images of electronic object 102A and electronic object 102B, respectively, that may have been obtained during a preview scan. As shown, both electronic objects 102A, 102B have manufacturer logos and various text printed on each surface, which may be identified and extracted from optical images of each electronic object 102A, 102B. It may also be appreciated that size, thickness, morphology, number of pins, and/or the like, may be identified and extracted from optical images of electronic objects 102A, 102B. It may be further appreciated that while electronic objects 102A, 102B may appear to be similar on an external surface and with respect to size and morphology, electronic objects 102A, 102B may have different internal characteristics, functions, and/or the like (e.g., electronic object 102A or electronic object 102B is a counterfeit of the other).

In some embodiments, the preview scan of the electronic object 102 may be performed, in part, by using Fourier Transform Infrared spectroscopy (FTIR). FTIR is a technique used to obtain infrared spectrum of absorption, emission, and photoconductivity of materials. Infrared (IR) laser sources located between the microwave and visible light has lower energy among the energy resource and can characterize the encapsulant material without damaging it. IR lasers are also transparent to encapsulant material and enable the characterization of subsurface materials.

Different IR spectroscopy with different wavelengths and bandwidth has been developed. They can be classified as near-infrared (NIR), mid-infrared (M-IR, or mid-IR), and far-infrared (F-IR). Due to the low energy and very low signal-to-noise ratio (SNR), far infrared is not an ideal method for material characterization. NIR spectroscopy is a very well-developed material characterization method that is widely used to characterize food, pharmaceutical, wood, and more. NIR characterization can be applied with a different model such as reflection, transmission, and interaction based on different applications. Typically, NIR is used as a non-destructive characterization method, so reflection mode is commonly selected. Due to NIR's high energy levels, NIR will have a very high signal-to-noise ratio (SNR) and short detection time. Also, portable NIR devices have been developed, which greatly increases the efficiency and decreases the human effort of counterfeit detection. Based upon these, NIR is an ideal candidate for counterfeit detection. However, because of its high energy and intense interaction with the material, the NIR will carry less material information compared with the mid-IR. Mid-IR spectroscopy is also very attractive for material characterization due to its wealthy material information. For example, attenuated total reflection flourier transform infrared (ATR-FTIR) is one of the MIR spectroscopies usually employed for non-destructive surface characterization, which requires a very good contact between the sample surface and tips. For package surface that is rough and hard, to achieve a better contact, a higher force is needed on the probing tip, which may damage the prober. Another type of M-IR spectroscopy is called Diffuse Reflectance Infrared Fourier Transform Spectroscopy (DRIFT) which can be applied in rough surface material characterization such as particulate. DRIFT characterizes the material by detecting signal intensity between the input signal and the diffraction reflection signal. As shown in FIG. 7, material difference can be detected between an exemplary authentic sample and an exemplary counterfeit sample based on the DRIFT spectrum. DRIFT may have low SNR as a contactless method, and it may need proper data preprocessing to help the counterfeit detection.

In some embodiments, data preprocessing is implemented to increase the SNR of FTIR data and to improve the accuracy of the subsequent classification model. The noise in FTIR data may come from different sources, such as machine and environment noise, rough sample surface, silica filler reflection, different material single coupling, etc. Different methods may be adopted to compensate for the noise, such as scattering correction and baseline correction method. Scattering correction is designed to reduce the physical scatter difference between different scanning. There are two widely used versions: Multiplicative Scatter (MSC)

and Standard Normal Variate (SNV). The MSC requires a reference spectrum to prepress the other dataset, while SNV does not. However, due to the complexity of the encapsulant sample surface between different types of IC, each type of IC sample requires a reference spectrum. In this disclosure, only SNV is tested as scatter normal variate in some embodiments of the invention. In addition, taking the derivatives of the original data can help remove the different material signal coupling and smooth the dataset. FIG. 8 shows the results of different exemplary data preprocessing methods. Both 1st and 2nd Savitzky-Golay (SG) with 11 points smoothing are tested. The performance of this static algorism will be tested on the classification model herein later.

In some embodiments, feature selection and dimensional reduction methods are used to decrease the dimensionality of the FTIR data and find the most representative features. This may avoid overfitting when using the FTIR data to train the machine learning models. In addition, the training process is dramatically faster with lower numbers of features per sample. In some embodiments, interval Partial Least-Squares (iPLS) may be used to find the most important features. For example, for a FTIR spectrum with 1738 data points, iPLS may separate the whole dataset into 17 individual sections after dropping the first 38 data points, and each section contains 100 data points. The dataset is used to train the PLS regression model in each subsection, and the result is evaluated by the root mean square error 3-fold cross-validation (RMSECV). The RMSECV result from iPLS of the exemplary FTIR spectrum is shown in FIG. 9. Each section has a similar RMSECV score, which means all the data points might have evenly contributed to counterfeit detection.

In some embodiments, principal component analysis (PCA) is used to decrease the number of features of the FTIR spectrum. PCA projects the original datapoint to new features, known as principal components, which carry greater information density. For example, as shown in FIG. 10, five of the principal components (PCs) explain over 95% of the variation within the original dataset. PCA can couple with the classification model such as a support vector machine (SVM) and linear discriminant analysis (LDA) model to achieve higher accuracy and lower overfitting.

In some embodiments, towards the goal of counterfeit detection, supervised machine learning algorithm can be used to separate the authentic and counterfeit FTIR spectrum. In some embodiments, a binary classification model, such as LDA, SVM, random forest, and multi-layer perceptron (MLP) classification models, can be applied to the preprocessed datasets. After the dataset is separated into a training dataset and a test dataset, each model may be independently trained on the training portion. The models' performance may then be evaluated on the test dataset by cross-validation.

LDA bears a resemblance to PCA, which uses Euclidean projection to increase information density among features. However, LDA takes the label into consideration and finds a hyperplane to best separate two groups of data with different labels. Support vector machines (SVMs) are also determining a hyperplane to separate the data. However, based on a user-supplied kernel function, the hyperplane used to separate the data group can be curved to improve classification accuracy. Both the linear SVM model with linear kernel and the non-linear SVM model with the polynomial kernel may be used. Random forest (RF) classifiers are built based on decision trees. RF builds multiple decision trees by randomly selecting dataset features and comparing their ability to distinguish labels in a tournament style. Once a "tournament" tree is constructed, test data is run through decision trees to produce a new label. A small, dense multi-layer perceptron (MLP) may also be used to perform classification. The MLP works through identifying optimal weights to multiply with each feature to pass into an objective function. The result of this objective function is tested against known training data, which can be used to further refine the initial weights. In some embodiments, the MLP has one hidden layer with 75 nodes and ReLu activation.

An experiment was conducted to demonstrate performance of exemplary preprocessing methods and classification models, in accordance with some embodiments of the present invention. The samples used in the experiment are summarized in FIG. 11, including 138 samples from 20 different types of ICs. Among these samples, there are 87 authentic samples and 51 counterfeit samples. The samples are purchased from the open market and possess encapsulant packaging. Counterfeit samples are purchased from untrusted vendors who are offshore. Authentic samples are purchased from trusted, onshore vendors. To ensure sufficient variability, up to five FTIR spectrums (for example, DRIFT spectrums) were collected from each sample. In total, 685 measurements were obtained across all devices. The DRIFT spectrums are collected by the Nicolet iS50 FTIR and Continuum FTIR microscope. The $CO_2$ and $H_2O$ noise is removed by scanning the background for each spectrum. After removing the zero data, each spectrum covers the bandwidth from 649.9 to 3999.7 $cm^{-1}$. Each spectrum was scanned 32 times and calculated as the average.

In the experiment, all the collected FTIR data was stored in a matrix. Each waveform was labeled authentic or counterfeit based on the physical sample being scanned. This generated a total dataset of [685 measurements×1738 samples/waveform]. Subsequently, different types of preprocessing were applied to the original dataset, as shown in FIGS. 12A and 12B. These methods include both scattering removal and dimensionality reduction. Next, the following models were used to generate classification labels as previously described: LDA, linear SVM, non-linear SVM, random forest, and MLP. Unsupervised methods were also used to visualize the preprocessed data. In some embodiments, although not all the hyperparameters of machine learning are adjusted to achieve very high model accuracy, the high accuracy obtained indicates encapsulant material differences exist between authentic and counterfeit samples.

In one embodiment, all the data from 20 different package types were used, which is denoted 'global' counterfeit detection. The goal of this process was to determine whether the material differences encountered were consistent against a variety of sample types. Six different data preprocessing strategies were tested to increase the performance of the model on the classification result. As shown previously in FIG. 9, the whole IR spectrum has an even contribution to the result and was therefore utilized in this experiment. Where PCA dimensional reduction is adopted, 10 PCs are selected, covering 98% of the original data's variance. The accuracy and standard deviation results of five exemplary classification models are shown in the FIG. 12A. Each of the classification models was tested with six different data preprocessing methods with or without PCA dimensionality reduction. FIG. 12A shows SNV with PCA dimensionality reduction exhibited the best performance across all preprocessing techniques. The MLP model achieved 92% accuracy against the 'global' sample set. Also, RF demonstrated reasonable performance by attaining over 90% accuracy in a wide number of scenarios. When employed, PCA increased efficiency and largely raised accuracy during this counterfeit detection experiment. All models with an accuracy of over 90% are trained on the dataset with PCA dimensional reduction.

In another embodiment, 'individual' counterfeit detection was evaluated to further determine whether the material difference can be used more reliably. Although packaging encapsulant material varies widely across different applications, it should be consistent for a given sample type. Based on this assumption, data from one sample type, 'STM32F103RCT6', was used to train the model for the 'individual' dataset. This subset contains 10 counterfeit samples and 9 authentic samples. The same experiment was performed once more with revised data, where accuracy and standard deviation results are shown in FIG. 12B. Most of the classification models trained by different preprocessed data have increased accuracy, and some achieve 100% accuracy. This result clearly shows the material difference between counterfeit and authentic samples for one certain type of ICs. Note that the 'individual' counterfeit detection requires a new model for each type of sample, which prevents generalizing the counterfeit discrimination model to unseen sample types.

In some embodiments, the FTIR data (or FTIR spectrum) obtained from the preview scan of the electronic object 102 can be used to prevent false positives and negatives during the preview scan through the classification models (alternatively referred to herein as the machine learning models) developed to separate the authentic and counterfeit FTIR spectrum. In some embodiments, PCA and/or a preprocessing method are applied to the FTIR data before applying the classification models.

Returning to FIG. 3, operation 320 follows operation 310, in one embodiment. Operation 320 comprises determining whether the electronic object 102 is associated with an existing electronic object identified in a THz validation database based at least in part on the preview scan—or information extracted from the preview scan of the electronic object 102. In other words, operation 320 may comprise identification of the electronic object 102. The THz validation database may store data corresponding to various electronic objects each identified by information extracted from preview scans, such as manufacturer, number of pins, size, FTIR spectrum, and/or the like. It may be appreciated however that such identifying information for various electronic objects in the THz validation database may be obtained via methods other than preview scans or the specific rapid imaging modalities used in preview scans.

If the electronic object 102 is determined to not be associated with an existing electronic object identified in the THz validation database, operation 330 follow operation 320, in one embodiment. Operation 330 comprises collecting background information, or ground truth data. Generally, operation 330 may comprise time consuming inspection tools and techniques to collect at least design information of the electronic object 102 (e.g., an IC).

Background information (e.g., IC design information), or ground truth data, may be collected using various methods for volumetric, chemical and/or electrical inspection. Background information may be collected using non-THz inspection. For example, background information may be obtained via X-ray imaging. FIGS. 4C and 4D provide X-ray images 402A, 402B of corresponding electronic objects 102A, 102B, respectively. As shown, background information may comprise information concerning the internal structures and configurations of the electronic objects 102A, 102B, which can be observed via X-ray imaging. Background information may also be collected using FTIR. While THz imaging is associated with a lower cost per inspection or per electronic object 102, THz imaging may have a lower spatial resolution compared to other imaging or inspection methods (e.g., X-ray imaging and inspection). As such, in various embodiments, background information is collected to supplement THz data (e.g., chemical and electrical information) for the electronic object 102 that may be collected. As such, classification and evaluation of the electronic object 102 is not solely reliant on collected THz data for the electronic object 102.

Background information, such as X-ray images, may be used to model how a THz beam will interact with a sample. Background information from other tools, such as X-ray, scanning electron microscope (SEM), Fourier-transform infrared spectroscopy (FTIR), electrical probing, and/or the like, may be used for ground truth data collection from the electronic object 102 (e.g., an IC). For example, near-field scanning optical microscopy (NSOM) may be used to collect background information of surface features of the electronic object 102 with spatial resolution under 50 nm. In various embodiments, nondestructive techniques are used, thereby enabling the IC to be qualified and used later on. In other example embodiments, destructive techniques can be used for ground truth collection to develop the highest level of confidence in authenticity and spatial and spectral resolution.

In some embodiments, background information is collected based at least in part on near-field THz data collection. While near-field THz data collection may be time-intensive (e.g., hours of scan time), background information may be collected at high spatial and spectral resolution. Specifically, near-field THz data collection collects THz signals near the surface of the electronic object 102, enabling a higher spatial resolution of characterization than is possible with far field imaging techniques. In some embodiments, near-field THz data collection may enable collection of background information including chemical spectroscopy data. In some embodiments, collected background information may include images with subwavelength resolution collected by pulsed near-field THz data collection. In an example embodiment, background information may be collected by scanning microwave microscopy and/or atomic force microscopy.

In various embodiments, collecting background information comprises operations 331 and 332, which respectively comprise performing physical inspection of the electronic object 102 to verify the authenticity of the electronic object 102, and human-in-the-loop annotation. In various embodiments where the electronic object 102 is an IC, collecting background information comprises obtaining IC design knowledge from other sources (e.g., computer-aided design (CAD) footprint, electronic design automation (EDA) Tools).

Collecting background information may then comprise and/or be followed by operation 333, which comprising storing the background information, or ground truth data, in the THz validation database. It may be appreciated then that a subsequent electronic object may be determined to be associated with an electronic object in the THz validation database at operation 320 based at least in part on identifying preview scan information for the subsequent electronic object as being substantially similar to background information for the electronic object in the THz validation database. As such, collection of background information or ground truth data is a one-time collection per electronic object type, class, design, and/or the like (e.g., IC chip design).

THz Data Collection

Meanwhile, if the electronic object 102 is determined to be associated with an electronic object in the THz validation database, THz data collection may be performed for the electronic object 102. As shown in FIG. 3, THz data collection may begin with operation 341, in one embodiment. Operation 341 comprises configuring a THz data collection and/or imaging system 110 based at least in part on background information previously collected and/or stored in the THz validation database for the electronic object type, class, design, and/or the like (e.g., IC chip design) of the electronic object 102.

In various embodiments, configuring the THz imaging system comprises determining optimized collection parameters. Optimized collection parameters may include geometry-related parameters (e.g., angle of incidence, spot size) and scanning-related parameters (e.g., dwelling time, frequency step size). Optimized collection parameters may be determined and configured based at least in part on background information, and may be continuously configured or configured at a later time based at least in part on THz data collection.

In various embodiments, operation 341 further comprises determining various THz data collection procedures to be performed. For example, more complex electronic object designs (e.g., IC designs) may require multiple scans from various trajectories and a reconstruction process to combine multiple THz collections into 3D data. As such, it may be determined to perform computed tomography (CT) to collect 3D THz data for the electronic object 102. In some instances, CT may be limited in collecting 3D THz data due to the limitations of penetration depth for THz wavelengths, and thus, it may be determined to perform additional X-ray volumetric imaging to supplement the performance of CT. As such, collected background information may be used to determine the complexity of the electronic object 102 and to determine one or more relevant THz data collection procedures to be performed for the electronic object 102.

In one embodiment, operation 342 follows operation 341. Operation 342 comprises collecting THz data for the electronic object 102. The THz data may be collected using one or more relevant THz data collection procedures previously determined, in various embodiments, THz data may be collected in an "in-line" manner as the electronic object 102 is being fabricated, manufactured, integrated, and/or the like. In various embodiments, the collected THz data comprises far-field THz signal data collected via THz-time domain spectroscopy (THz-TDS), such as time-domain spectra, THz frequency spectra, and THz phase information. Specifically, time-domain THz data may be collected via THz-TDS, and frequency-domain THz data may be derived from the collected time-domain THz data. Far-field THz signal data may be collected over a time span of seconds. The collected THz data may be based at least in part on THz signals from the electronic object 102 and/or from components of the electronic object 102 (e.g., pins). For example, the THz data may be collected based at least in part on the THz transmitter 112 transmitting a THz beam at the electronic object 102 and the THz receiver 114 receiving THz signals. Structural information for the electronic object 102 may also be collected via THz-TDS, which can measure layer thickness and map spectral chemical information to exact locations inside the electronic object 102 based at least in part on frequency-domain THz data (e.g., THz frequency spectra and THz phase information).

In various embodiments, the collected THz data may further comprise THz images collected via THz imaging. For example, FIGS. 4E and 4F show THz images 404A and 404B for corresponding electronic objects 102A and 102B, respectively. In addition to THz-TDS and THz imaging, other THz data collection procedures may be performed. THz computed tomography (THz-CT) imaging, tomosynthesis (TS), synthetic aperture radar (SAR), and/or time-of-flight (TOF) THz CT may be performed to collect 3D THz data and/or images of the internal structure of a complex electronic object 102, in various embodiments. THz CT may provide superior spectral characterization compared to X-ray micro-focus CT, which is currently used to perform volumetric inspection of PCBs in an off-line failure analysis workflow. Specifically, while X-ray micro-focus CT may have high volumetric capabilities, X-ray micro-focus CT uses flat panel detectors that are limited by the conversion of X-ray radiation into visible light. Furthermore, THz CT, or THz spectral CT, may provide colored images in THz range, while X-ray micro-focus CT provides only monochrome images. Thus, collected THz data may include colored THz CT images. THz CT may enable analysis of the chemical composition of the electronic object 102 based at least in part on the colored images, or spectral fingerprints, from THz CT. However, in certain embodiments, THz CT may be limited by the thickness of the electronic object 102, as the low power of THz transmitters 112 does not enable large transmission percentages for THz radiation. As such, various embodiments may perform THz CT based at least in part on a thickness or size of the electronic object 102.

In various embodiments, the electronic object 102 is a PCB, and time domain THz CT 3D imaging may be performed for PCB delamination detection. Time domain THz CT 3D imaging may be advantageous when compared to traditional tomographic imaging, which has substantial difficulty in determining the layer index of refraction and absorption properties without ambiguity. In general, CT methods enable generation of cross-sectional slices enabling accurate layer by layer inspection, and various embodiments performing THz CT imaging may enable layer isolation of dielectric properties and delamination. THz CT may incorporate knowledge about an electronic object to reconstruct deviations from expected based at least in part on a modelling. For example, a model comprising Monte Carlo extension of usual ray tracing methods may be used to account for the Gaussian intensity profile of THz beam and considers refraction and reflection losses when propagating through an electronic object.

In various embodiments, pulsed THz-TDS may be performed to collect THz data with increased spatial and spectral resolution, thereby enabling smaller feature identification. This THz data captured via pulsed THz-TDS may capture charge carrier dynamics in an electronic object 102 of semiconductor material.

As THz data for the electronic object 102 is being collected, a metamaterial waveguide may be constantly and continuously configured. The metamaterial waveguide enhances THz signals at the THz receiver 114 to iteratively improve THz signal collections with each new scan of THz data. Constant and continuous configuration of the metamaterial waveguide enables optimization of collection or exposure time, thereby ensuring confidence in the THz data and validations or classification based at least in part on the THz data. Collection or exposure time is also optimized to confirm that THz signal features are adequately captured in order to generate a THz fingerprint. Waveguiding techniques can increase the signal collection quality, and these waveguides structure and configuration are specific to the emitted THz signals passing through the electronic object 102. A waveguide may be unique for each electronic object type, class, and/or design (e.g., IC design), in various embodiments. In further embodiments, a waveguide may be unique for each individual electronic object 102 (e.g., an IC). In various embodiments, configurable waveguides are used to "focus" and tune the signal collection for each electronic object 102. In various embodiments, a waveguide may be based at least in part on a simulation using a point spread function (PSF) or empirical data from other inspection tools, devices, or systems. Thus, various embodiments may implement an adaptive beamforming waveguide.

In one embodiment, operation 343 may follow operation 342. Operation 343 comprises resolution enhancement and signal processing of THz data (e.g., data collected in operation 342). In various embodiments, operation 343 comprises deconvolution of THz data, wavelet denoising, and/or other techniques that incorporate convolutional neural networks to process the THz data. Resolution enhancement and signal processing of THz data may be based at least in part on knowledge about interactions between THz beams and the electronic object 102, and thus, various embodiments may implement an adaptive reconstruction algorithm that constantly and continuously updates based at least in part on new THz data. In various embodiments, such knowledge may be determined or simulated using a representation of the electronic object 102 (e.g., a corresponding CAD model). In various embodiments, resolution enhancement may also be applied to THz images in the THz data.

A THz fingerprint may be generated or determined based at least in part on collected THz data, and specifically electrical information, time-domain spectra, THz frequency spectra, and phase information. Specifically, the THz fingerprint may be, may comprise, and/or may be based at least in part on a time domain footprint and a frequency domain footprint. A THz fingerprint may comprise information such as mixed translational-rotational mode, in-phase rotation mode, out-of-phase rotational mode, and/or individual molecular rotation mode. Various electronic objects 102 (e.g., electronic components) from different manufacturers have unique THz fingerprints. Furthermore, a unique THz fingerprint for an electronic object 102 may vary over time based at least in part on external and internal conditions (e.g., humidity, temperature). Although any certain composite material creates a unique THz fingerprint in reaction to the THz beams that can be observed and measured by THz-TDS systems, it is impossible to clone such composite material without knowing the exact ingredients and their exact portions for the purpose of achieving a similar THz fingerprint. Hence, THz fingerprints cannot be cloned by counterfeiters.

FIGS. 5A and 5B provide example THz fingerprints for three different electronic objects 102. As shown, a THz fingerprint may comprise a THz pulse signal with respect to a time delay (e.g., time-domain THz data 502) and a Fourier spectrum of the THz pulse signal (e.g., frequency-domain THz data 504). As mentioned, THz fingerprints for different electronic objects 102 may be unique. For example, a THz fingerprint for a first electronic object 102 may have a maximum amplitude peak at a different time compared to a THz fingerprint of another electronic object 102 in a time-domain. For example, a THz fingerprint may be attenuated at certain places in the THz pulse signal compared to another THz fingerprint. Further differences in THz fingerprints may also be observed in the Fourier spectrum of each THz pulse signal.

FIG. 6 further illustrates THz fingerprints 600 for an electronic object 102. Time-domain THz data 502 is first obtained from the electronic object 102 via THz-TDS. Frequency-domain THz data 504 is then generated based at least in part on the time-domain THz data 502. For example, frequency-domain THz data 504 is generated based on performing Fast Fourier Transform operations on the time-domain THz data 502. Subsequently, a THz fingerprint 600 for the electronic object 102 may be generated based at least in part on the frequency-domain THz data 504. In some embodiments, the THz fingerprint 600 for an electronic object 102 may include, in part, data extracted from THz images of the electronic object 102 (e.g., THz images 404A, 404B).

Object Validation and Classification

Following THz spectroscopy and imaging, validation and classification of the electronic object 102 may be performed. In various embodiments, operation 350 may be performed, which comprises comparing the collected THz data for the electronic object 102 (e.g., THz fingerprints) to data stored in the THz validation database. For example, the THz validation database may store an earlier THz fingerprint for the electronic object 102 obtained at a point in time earlier in the supply chain, and the generated THz fingerprint 600 may be compared with the earlier THz fingerprint as a reliability evaluation of the electronic object 102. As another example, the THz validation database may store THz fingerprints for an object type, class, design, and/or the like, and the generated THz fingerprint 600 of the electronic object 102 may be compared to the stored THz fingerprints to determine whether the electronic object 102 is a counterfeit of the object type, class, design, and/or the like.

Such a comparison may be performed based at least in part on various machine learning models and deep learning networks. In various embodiments, discrimination and classification neural networks are used to compare the in-line collected THz data (e.g., THz fingerprints 600) for the electronic object 102 to database data and to assign or determine a classification for the electronic object 102. For example, principal component analysis (PCA) may be used to identify features in THz fingerprints 600, enabling THz fingerprints 600 to be compared on a feature-basis. Other discriminant analysis techniques may be used, such as a support vector machine (SVM), linear discriminant analysis (LDA), quadratic discriminant analysis (QDA), agglomeration or agglomerative clustering, and/or the like. Additionally or alternatively, image enhancement procedures and neural networks may be used. In various embodiments, bimodal image fusion process may be used to incorporate both optical and THz data (e.g., images).

In various embodiments, various reliability functions are performed, such as (i) acquiring THz fingerprints for the electronic object 102 under multiple operating conditions, (ii) comparing such THz fingerprints with certain measures to determine their closeness and relationships, and (iii) determining the reliable THz fingerprints to be positioned into the THz validation database for future analysis.

Comparing the in-line collected THz data for the electronic object 102 to database data may comprise configuring (e.g., allocating) computing and processing resources in order to perform comparisons in an efficient manner. For example, a number of graphical processing units (GPUs), central processing units (CPUs), tensor processing units (TPUs) may be allocated, configured, used, and/or the like, for comparing the in-line collected THz data (e.g., THz fingerprints 600, THz images 404) for the electronic object 102 to database data.

Based at least in part on comparing the in-line collected THz data (e.g., THz fingerprints 600, THz images 404) to data stored in the THz validation database, a classification may be generated, assigned, determined, and/or the like, for the electronic object 102. For example, a first classification (e.g., pass, trusted, genuine, reliable) may be determined for the electronic object 102 at operation 351. Meanwhile, a second classification (e.g., fail, untrusted, counterfeit, defective) may instead be determined for the electronic object 102 at operation 351. In various embodiments, the classification for the electronic object 102 is determined based at least in part on a deep learning model.

Based at least in part on the classifications (e.g., a first classification, a second classification) determined at operation 351, various classification-based actions may be performed. In various embodiments, for example, the electronic object 102 may be added to a trusted inventory of electronic objects based at least in part on a first classification being determined for the electronic object 102. In an example embodiment, electrical defect localization may be performed to identify local regions of interest within the electronic object 102 (e.g., electrical discontinuities, counterfeit structures).

In various embodiments, for example, background information, or ground truth data, may be collected for the electronic object 102 based at least in part on a second classification being determined for the electronic object 102. By collecting background information for an electronic object 102 with a second classification (e.g., fail, untrusted, counterfeit), a deep learning model for classifying the electronic object 102 may be trained with iterative deep learning in operation 360. In some embodiments, operation 360 comprises iterative deep learning with human-in-the-loop. As previously described, collecting background information may comprise collecting human-in-the-loop data or annotations in operation 332. For example, human-in-the-loop data collection of known counterfeit electronic objects versus genuine electronic objects 102 (e.g., ICs) is used to train a deep learning model for classifying electronic object 102. While initial iterations of the process 300 may require a high amount of human-in-the-loop data collection, it will be appreciated that less time is needed to validate and classify an electronic object 102 as more human-in-the-loop data is collected. Furthermore, human-in-the-loop data collection may improve beam modelling for in-line collection of THz data.

Specifically, at operation 332, human-in-the-loop data collection or human-in-the-loop annotation may comprise using an adaptive segmentation algorithm (ASA) to generate masks of structural IC features for THz images to train the iterative deep learning models. These structural IC features are then verified by a user or human operator. Such an approach is advantageous, as manual labelling may be inaccurate, expensive, and impossible without outside knowledge from other electrical, optical, or electromagnetic field (EMF) tools. A deep learning approach is subsequently used to feed newly predicted and accepted deep learning masks/images to a training set of the deep learning model. Thus, in various embodiments, the error rate of classifying an electronic object 102 is reduced by implementing human input at an initialization or learning stage. In various embodiments, human input (e.g., manual labelling) may be removed after adequate training.

By incorporating neighboring data points such as human-in-the-loop data besides the input THz data point itself, the deep learning model's performance may be increased significantly. In various embodiments, a deep learning model which takes both the data instances of an input point and a neighbors' classification responses as inputs (e.g., IC design information, THz data with human-in-the-loop annotations, other background information) may be used to develop a higher quality THz fingerprint compared to a deep learning model with THz data as the sole input.

Deep learning may be further applied to derive the complexities of how the THz beam interacts with authentic versus counterfeit electronic objects 102 (e.g., electronic objects 102 with a first classification versus electronic objects 102 with a second classification) while iteratively optimizing for collection speed to meet inspection time requirements with high confidence. Various embodiments comprising deep learning models may be used for an automated pass/fail detection or classification algorithm to give a general confidence interval of THz in-line inspection ability to provide authenticity for a given IC design configuration based at least in part on background information. Therefore, as aforementioned, deep learning models trained with background information may be applied to (i) determine how THz data (e.g., THz fingerprint 600, THz images 404) of an untrusted electronic object 102 compares to THz of the particular object design of the untrusted electronic object 102, and (ii) determine how THz data of an electronic object 102 compares to previously collected THz data of the same electronic object 102 (e.g., for reliability evaluation, blockchain inventory tracing, and traceability).

In some embodiments, validation and classification of the electronic object 102 may be performed using machine learning models developed based at least on the FTIR and THz data. A hybrid metrology, for example, one that is based on a combination of the FTIR and THz signals, can generate a higher counterfeit detection accuracy than a single inspection method alone. In other embodiments, Generative Adversarial Networks (GANs) can be used to integrate the FTIR machine learning model and the THz machine learning model to generate synthetic measurement data of the sample under test to increase the database size. In some embodiments, the synthetic measurement data comprises the surface information of the sample under test. The surface is the most accessible portion of the sample and therefore is the most vulnerable to modification such as blacktopping.

It should be understood that the examples and embodiments described herein are for illustrative purposes only and that various modifications or changes in light thereof will be suggested to persons skilled in the art and are to be included within the spirit and purview of this application. Although the present disclosure is considered complete and comprehensive, additional context and insight may be gleaned from the appendices attached alongside this specification (which describe generally systems, apparatuses, and methods in accordance with embodiments herein). It should be understood that the examples and embodiments in Appendices A-D are also for illustrative purposes and are non-limiting in nature. The contents of Appendices A-D are incorporated herein by reference in their entirety.

VI. Conclusion

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

What is claimed is:

1. A method for classifying an electronic object, the method comprising:
   capturing, using at least one of a non-terahertz (THz) data collection or imaging system or a Fourier transform infrared spectroscopy (FTIR), a first set of observed data for the electronic object, wherein the first set of observed data comprises external physical characteristic data of the electronic object;
   determining, based at least in part on the first set of observed data for the electronic object, whether the electronic object is associated with information stored in an object database;
   responsive to determining that the electronic object is associated with information stored in the object database, capturing, using at least a THz data collection or imaging system, a second set of observed data for the electronic object;
   generating a THz fingerprint for the electronic object based at least in part on the second set of observed data; and
   generating and assigning a classification for the electronic object based at least in part on a comparison of the THz fingerprint for the electronic object with the information stored in the object database associated with the electronic object.

2. The method of claim 1, wherein the THz fingerprint comprises frequency spectra and phase information of THz signals observed from the electronic object via the THz time domain spectroscopy.

3. The method of claim 2, wherein the THz signals is obtained by configuring the THz time domain spectroscopy to perform at least one of a raster scan or a point scan of the electronic object.

4. The method of claim 1, wherein the information stored in the object database associated with the electronic object comprises at least one of an earlier THz fingerprint for the electronic object generated at an earlier point in time or a THz fingerprint for an object design of the electronic object generated based at least in part on observed data for a plurality of electronic objects of the same object design.

5. The method of claim 1 further comprising performing at least one classification-based action, wherein the at least one classification-based action is selected based at least in part on the classification.

6. The method of claim 5, wherein the at least one classification-based action comprises capturing a third set of observed data for the electronic object and storing the third set of observed data in the object database, wherein the third set of observed data comprises user input data.

7. The method of claim 1, wherein the first set of observed data for the electronic object further comprises a FTIR spectrum for the electronic object.

8. The method of claim 7, wherein generating and assigning the classification for the electronic object is further based at least in part on a comparison of the FTIR spectrum for the electronic object with the information stored in the object database associated with the electronic object.

9. The method of claim 7 further comprising generating a first set of synthetic measurement data associated with the electronic object and storing the first set of synthetic measurement data in the object database, wherein the first set of synthetic measurement data is generated based at least in part on the second set of observed data and the FTIR spectrum.

10. The method of claim 9, wherein the first set of synthetic measurement data is generated using a generative adversarial network.

11. The method of claim 1 further comprising responsive to determining that the electronic object is not associated with information stored in the object database, capturing a fourth set of observed data for the electronic object and storing the fourth set of observed data in the object database.

12. The method of claim 1, wherein the THz data collection or imaging system is configured based at least in part on the first set of observed data and/or the information stored in the object database associated with the electronic object.

13. A system for classifying an electronic object, the system comprising:
   a terahertz (THz) data collection or imaging system configured to at least capture THz data based at least in part on observing THz signals from an object;
   at least one of a non-THz data collection or imaging system or a Fourier transform infrared spectroscopy (FTIR); and
   an apparatus comprising at least one memory and at least one processor, the at least one memory comprising computer program code, wherein the at least one memory and the computer program code are configured to cause the at least one processor to:
      capture, using the at least one of a non-THz data collection or imaging system or a FTIR, a first set of observed data for the electronic object, wherein the first set of observed data comprises external physical characteristic data of the electronic object;
      determine, based at least in part on the first set of observed data for the electronic object, whether the electronic object is associated with information stored in an object database;
      responsive to determining that the electronic object is associated with information stored in the object database, capture, using at least the THz data collection or imaging system, a second set of observed data for the electronic object, wherein the THz data collection or imaging system is configured based at least in part on the first set of observed data and/or the information stored in the object database associated with the electronic object;
      generate a THz fingerprint for the electronic object based at least in part on the second set of observed data; and
      generate and assign a classification for the electronic object based at least in part on the THz fingerprint for the electronic object and the information stored in the object database associated with the electronic object.

14. The system of claim 13, wherein the THz fingerprint comprises frequency spectra and phase information of THz signals observed from the electronic object via THz time domain spectroscopy, wherein the THz signals is obtained by configuring the THz time domain spectroscopy to perform at least one of a raster scan or a point scan of the electronic object.

15. The system of claim 13, wherein the information stored in the object database associated with the electronic object comprises at least one of an earlier THz fingerprint for the electronic object generated at an earlier point in time or a THz fingerprint for an object design of the electronic object generated based at least in part on observed data for a plurality of electronic objects of the same object design.

16. The system of claim 13, wherein the at least one memory and the computer program code are further configured to cause the at least one processor to perform at least one classification-based action, wherein the at least one classification-based action is selected based at least in part on the classification.

17. The system of claim 13, wherein the first set of observed data for the electronic object further comprises a FTIR spectrum for the electronic object.

18. The system of claim 17, wherein generating and assigning the classification for the electronic object is further based at least in part on a comparison of the FTIR spectrum for the electronic object with the information stored in the object database associated with the electronic object.

19. The system of claim 17, wherein the at least one memory and the computer program code are further configured to cause the at least one processor to generate a first set of synthetic measurement data associated with the electronic object and store the first set of synthetic measurement data in the object database, wherein the first set of synthetic measurement data is generated based at least in part on the second set of observed data and the FTIR spectrum, wherein the first set of synthetic measurement data is generated using a generative adversarial network.

20. The system of claim 13, wherein the at least one memory and the computer program code are further configured to cause the at least one processor to, responsive to determining that the electronic object is not associated with information stored in the object database, capture a fourth set of observed data for the electronic object and storing the fourth set of observed data in the object database.

\* \* \* \* \*